US011687538B2

(12) United States Patent
Lal et al.

(10) Patent No.: US 11,687,538 B2
(45) Date of Patent: Jun. 27, 2023

(54) MULTI-DATA STORE CONTENT IDENTIFICATION AND DISPLAY INTERFACE

(71) Applicant: Microsoft Technology Licensing, LLC, Redmond, WA (US)

(72) Inventors: Ankur Lal, Seattle, WA (US); Kyle Patrick Curlett, Seattle, WA (US); Daniel Sungje Choi, Seattle, WA (US); Fiona Lieurance Gasaway, Seattle, WA (US); Cara Leggett Silver, Seattle, WA (US); Jonathan Ari Hollander, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 17/195,592

(22) Filed: Mar. 8, 2021

(65) Prior Publication Data

US 2022/0284029 A1 Sep. 8, 2022

(51) Int. Cl.
*G06F 16/2457* (2019.01)
*G06F 3/04817* (2022.01)

(52) U.S. Cl.
CPC .... *G06F 16/24578* (2019.01); *G06F 3/04817* (2013.01); *G06F 2203/04803* (2013.01)

(58) Field of Classification Search
CPC ................................................ G06F 16/24578
See application file for complete search history.

(56) References Cited

U.S. PATENT DOCUMENTS

2005/0289109 A1* 12/2005 Arrouye ................. G06F 16/38
2006/0036568 A1* 2/2006 Moore ................. G06F 16/168

* cited by examiner

*Primary Examiner* — Roland J Casillas

(57) ABSTRACT

Systems and methods directed to grouping and displaying query results from multiple data stores are described. More specifically, a plurality of data stores to search utilizing a received keyword may be determined, where each data store includes a different search index. A data store specific query for each data store is generated such that results from each data store are received based on the respective data store specific query, where results from each data store include a plurality of file identifiers identifying files located at the respective data store that are relevant to the keyword. In addition results from each data store are grouped into a plurality of groups based on metadata associated with each file identifier of the plurality of file identifiers. The plurality of groups are ranked based on a relevancy associated with each group and information associated with a ranked group is displayed at a user interface.

20 Claims, 14 Drawing Sheets

MULTI-DATA STORE CONTENT IDENTIFICATION AND DISPLAY INTERFACE

BACKGROUND

As cloud storage becomes less expensive and more available, users tend to store documents in various different cloud repositories or data stores. Locating documents stored in the various different cloud repositories or data stores can be difficult for users, for instance, if they cannot remember where such documents are stored. Moreover, such documents may be stored multiple times in each of the cloud repositories. Similarly, with all of the documents that users encounter on a daily basis, it is often difficult to remember if a document was stored in a cloud repository, locally on a computing device, or viewed in an e-mail. Thus, time is wasted, and frustration mounts as a user attempts to find a document and/or the correct version of a document stored in one of a variety of different places. Further, if a user does attempt to find a document, the user generally has to separately search each cloud repository, further increasing the amount of time required by the user to locate a document.

While each cloud repository may maintain a search index for the user's content to optimize the speed and performance in finding relevant documents with a search query, integrating the search indexes from multiple cloud repositories is problematic due to data security restrictions placed on the underlying content (e.g., file content) associated with each search index. For example, although each cloud repository may programmatically provide access to its search index and may programmatically provide a list of files in response to a search query, the underlying content (e.g., the file content) associated with the search query would be needed to determine which files among multiple cloud repositories are duplicates. Further, without access to the content of each file returned in a search query, it difficult to compare query results to identify which results from which repositories may be more relevant than other results. Thus, a user would need to separately query each search index at each cloud repository to find relevant documents, review and identify duplicate documents, and then identify those documents, potentially from multiple cloud repositories, that are most relevant to the document they are looking for. It is with respect to these and other general considerations that embodiments have been described. Also, although relatively specific problems have been discussed, it should be understood that the embodiments should not be limited to solving the specific problems identified in the background.

SUMMARY

Users tend to store documents in various different cloud repositories or data stores. For example, a user may store documents in a Microsoft® OneDrive® data repository associated with the user's e-mail and a user's Microsoft account; the user may store documents in a Google Drive® data repository associated with the user's Google Drive account; the user may store documents in an Amazon AWS data repository associated with the user's Amazon account. Further, a user may use their e-mail as a type of document versioning control system by sending and receiving e-mails that include file attachments having the latest edits or changes. In some instances, e-mail is used as a means to transport files across various networks. For example, a user may forward an e-mail with an attachment from their work e-mail account to their private e-mail account in order to print the attachment at home. Accordingly, multiple e-mail accounts for a user may act as various data repositories that include files in the form of e-mail attachments. Of course, other data repositories are available and may contain documents associated with the user.

In some instances, a user may receive an e-mail and may save the attachment in one or more data repositories. For example, the user may save the e-mail attachment in the Microsoft OneDrive data repository, copy the attachment to the Google Drive repository and then edit the document. When the user wishes to edit the document again or send the document to another user, oftentimes, the user may not remember which store has the latest document version and may select the incorrect version. That is, in some instances, the user may select an e-mail attachment directly from one of many e-mail accounts, or the user may select a document that is in the Microsoft OneDrive data repository or the Amazon AWS data repository. Accordingly, a single unified interface allowing a user to view e-mail attachments from one or more e-mail accounts and documents residing in one or more data repositories would assist the user with the selection of the correct document when searching for the document, editing the document, and/or sending the document to another user.

Aspects of the present disclosure are directed to a method for grouping and displaying query results from multiple data stores. The method may include receiving a keyword as an input; determining a plurality of data stores to search utilizing the received keyword, wherein each data store of the plurality of data stores includes a different search index; generating a data store specific query for each data store of the plurality of data stores; receiving results from each data store based on the respective data store specific query, wherein results from each data store include a plurality of file identifiers identifying files located at the respective data store that are relevant to the keyword; receiving metadata associated with each file identifier of the plurality of file identifiers; grouping the results from each data store into a plurality of groups based on the metadata associated with each file identifier of the plurality of file identifiers; ranking the plurality of groups based on a relevancy associated with each group; and causing information associated with a ranked group of the ranked plurality of groups to be displayed at a user interface.

Aspects of the present disclosure are directed to a system for grouping and displaying query results from multiple data stores is described. The system may include a processor and memory including instructions which when executed by the processor, cause the processor to: receive from an input device, a keyword; determine a plurality of data stores to search utilizing the received keyword, wherein each data store of the plurality of data stores includes a different search index; generate a data store specific query for each data store of the plurality of data stores; receive results from each data store based on the respective data store specific query, wherein results from each data store include a plurality of file identifiers identifying files located at the respective data store that are relevant to the keyword; receive metadata associated with each file identifier of the plurality of file identifiers; group the results from each data store into a plurality of groups based on the metadata associated with each file identifier of the plurality of file identifiers; rank the plurality of groups based on a relevancy associated with each group; and cause information associated with a ranked group of the ranked plurality of groups to be displayed at a user interface.

Aspects of the present disclosure are directed to a computer-readable storage medium including instructions for grouping and displaying query results from multiple data stores. The instruction, which when executed by a processor, cause the processor to: receive from an input device, a keyword; determine a plurality of data stores to search utilizing the received keyword, wherein each data store of the plurality of data stores includes a different search index; generate a data store specific query for each data store of the plurality of data stores; receive results from each data store based on the respective data store specific query, wherein results from each data store include a plurality of file identifiers identifying files located at the respective data store that are relevant to the keyword; receive metadata associated with each file identifier of the plurality of file identifiers; group the results from each data store into a plurality of groups based on the metadata associated with each file identifier of the plurality of file identifiers; rank the plurality of groups based on a relevancy associated with each group; and cause information associated with a ranked group of the ranked plurality of groups to be displayed at a user interface.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
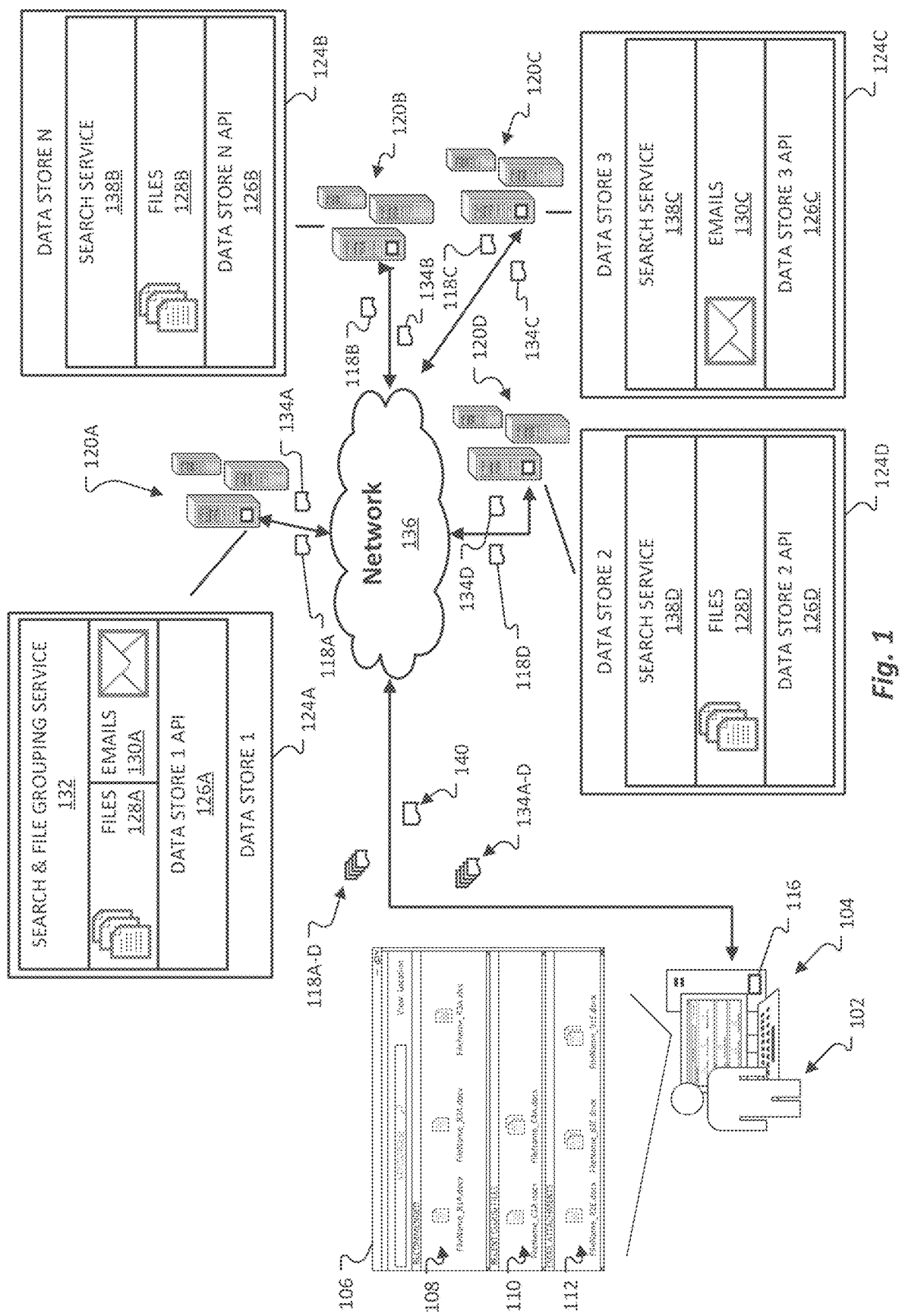
FIG. 1 depicts details of a multi-data store content identification system and display interface in accordance with examples of the present disclosure.

In the following detailed description, references are made to the accompanying drawings that form a part hereof, and in which are shown by way of illustrations, specific embodiments, or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As cloud storage becomes less expensive and more available, users tend to store files in various different cloud repositories or data stores. For example, a user may store files in a Microsoft® OneDrive® data repository associated with the user's e-mail and a user's Microsoft account; the user may store files in a Google Drive® data repository associated with the user's Google Drive account; the user may store files in an Amazon AWS data repository associated with the user's Amazon account. Further, a user may use their e-mail as a type of file versioning control system by sending and receiving e-mails that include file attachments having the latest edits or changes. In some instances, e-mail is used as a means to transport files across various networks. For example, a user may forward an e-mail with an attachment from their work e-mail account to their private e-mail account in order to print the attachment at home. Accordingly, multiple e-mail accounts for a user may act as various data repositories that include files in the form of e-mail attachments. Of course, other data repositories are available and may contain files associated with the user. In some instances, a user may receive an e-mail and may save the attachment in one or more data repositories. For example, the user may save the e-mail attachment in the Microsoft OneDrive® data repository, copy the attachment to the Google Drive repository and then edit the file. When the user wishes to edit the file again or send the file to another user, oftentimes the user may not remember which repository has the latest file version and may select the incorrect version. That is, in some instances, the user may select an e-mail attachment directly from one of many e-mail accounts, or the user may select a file that is in the Microsoft OneDrive data repository, or the Amazon AWS data repository. Accordingly, a single unified interface allowing a user to view e-mail attachments and files from a variety of different data repositories would assist the user in identification of the correct file, whether for viewing, editing and/or sending to another user.

In accordance with examples of the present disclosure, a file identification and unified display interface is described that allows a user to view e-mail attachments and files from one or more data stores. In examples, files and/or e-mail attachments matching or otherwise being relevant to user-provided keywords can be displayed to the user, where one or more versions of the same file may reside at different data stores. For example, an e-mail attachment can be stored at a data store associated with an e-mail system; the same e-mail attachment may be stored or otherwise reside at a second and/or third different data store. Examples provided herein describe identifying the file and then displaying the file, or an indication that the file exists, to the user. As each data store may index a user's content differently, examples provided herein utilize one or more interfaces to obtain search results provided by each data store. For example, a user may enter a keyword in an attempt to locate, or search for, a file. A first data store may make accessible a first application programming interface (API) that allows the user to search the first data store for files determined to be relevant to the user-provided keyword. The first data store may provide an ordered list of files, or files, matching or otherwise determined to be relevant to the user-provided keyword, where the list of files includes file identifiers identifying those files in the first data store. Similarly, a second different data store may make accessible a second different API that allows the user to search the second data store for files determined to be relevant to the user-provided keyword. The second data store may provide an ordered second list of documents, or files, matching or otherwise determined to be relevant to the user-provided keyword, where the list of documents, or files, includes file identifiers identifying those files in the second data store. In some examples, a third different data store may make accessible a third different API that allows the user to search the third data store for e-mail attachments determined to be relevant to the user-provided keyword. The third data store may provide an ordered third list of documents or files corresponding to e-mail attachments, matching or otherwise determined to be relevant to the user-provided keyword, where the list of documents, or files, includes file identifiers identifying those files in the third data store.

In examples, metadata associated with the file identifiers in the first list of files, the second list of files, and the third list of files may be compared to determine which files are the same or similar. While the different data store providers may make a search API accessible to return query results specific to the data store, most data store providers do not make the content associated with the query results accessible. For example, the content of a file, such as a word-processing document, may be secured, encrypted, or otherwise inaccessible and therefore is not available to a search API. Accordingly, metadata associated with each file identifier in the list of file identifiers may be used to compare and group file identifiers having the same or similar metadata. For example, each of the first list, second list, and third list of file identifiers may include file metadata associated with each of the files references by the file identifiers in each of the lists. Based on a comparison of the metadata, similar or same files may be determined and/or grouped together. For example, a first file in the first list may be a word processing document, a second file in the second list may also be a word processing document, and a third file in the third list may also be a word processing document. Each of the word processing documents referenced in each of the lists may correspond to the same document or a different document. In some examples, a file size may be different, however other metadata, such as author, filetype, timestamp, document creation information (e.g., originating file location or machine identifier), and/or metadata keywords may be the same. In this case, such files may be determined to be different versions of the same document and may be grouped together. In further examples, files referenced in each of the first, second, and third lists may be ordered or ranked based on relevance to the keywords of the query. In this case, some filegroups may be ranked above other groups based on individual rankings of files within the various lists. For example, a composite ranking for the filegroup may be determined based on the rankings and metadata of the files referenced within the various lists. Once the query results from multiple data stores are grouped and/or ranked, the results may be provided to a user in a user interface according to one or more user-configurable view settings.

FIG. 1 depicts details of a multi-data store content identification system and display interface 100 in accordance with examples of the present disclosure. The multi-data store content identification system and display interface 100 generally includes a computing device 104 associated with a user 102. The computing device 104, although depicted as a desktop computer, for example, may be any one of a portable or non-portable computing device. Examples of the computing device 104 include, but are not limited to, a virtual machine, a laptop, a desktop, or a server. The computing device 104 may run or otherwise execute a search and file grouping service 116. The search and file grouping service 116 may interact with or otherwise interface with one or more cloud services providers 120A-D providing access to one or more data stores 124A-124D. Content in each of the data stores 124A-124D may be accessed using a respective data store API 126A-126D. Content in each of the data stores 124A-124D may include but is not limited to files 128 (e.g., 128A, 128B, and/or 128D) and/or email and/or email attachments 130 (e.g., 130A, 130C).

The search and file grouping service 116 may receive one or more keyword(s) RC103 entered into a user interface 106 by the user 102 for example. The search and file grouping service 116 may determine which cloud services providers 120A-D are configured with or otherwise have been previously connected to the search and file grouping service 116. For example, a Google Drive® connection parameters (e.g., username, password) may be stored with or otherwise associated with a Google Drive® connection. Such information may reside at the computing device 104. Accordingly, the search and file grouping service 116 may generate a data store specific query 118A-118D based on the keyword(s) received from the user 102 and a specific data store. For example, a data store specific query 118A may be provided to the data store API 126A associated with the data store 124A of the cloud services provider 120A. In examples, the data store API 126A may provide the keyword(s) to the search and file grouping service 132 associated with the data store 124A which can determine one or more files and/or e-mail attachments that are relevant to the user-provided keyword(s) 103. That is, the search and file grouping service 132 may search the files 128A and e-mail attachments 130A based on the keyword(s) 103. The data store API 126A can then provide references to the relevant files and/or e-mail attachments as query results 134A.

Similarly, the search and file grouping service 116 may generate a data store specific query 118B based on the keyword(s) received from the user 102 and a specific data store. For example, a data store specific query 118B may be provided to the data store API 126B associated with the data store 124B of the cloud services provider 120B. In examples, the data store API 126B may provide the keyword(s) to the search service 138B associated with the data store 124B which can determine one or more files that are relevant to the user-provided keyword(s) 103. That is, the search service 138B may search the files 128B based on the keyword(s) 103. The data store API 126B can then provide references to the relevant files as query results 134B. The search and file grouping service 116 may generate a data store specific query 118C based on the keyword(s) received from the user 102 and a specific data store. For example, a data store specific query 118C may be provided to the data store API 126C associated with the data store 124C of the cloud services provider 120C. In examples, the data store API 126C may provide the keyword(s) to the search service 138C associated with the data store 124B which can determine one or more e-mails and/or e-mail attachments 130C that are relevant to the user-provided keyword(s) 103. That is, the search service 138C may search the one or more e-mails and/or e-mail attachments 130C based on the keyword(s) 103. The data store API 126C can then provide the relevant one or more e-mails and/or e-mail attachments as query results 134C. The search and file grouping service 116 may generate a data store specific query 118D based on the keyword(s) received from the user 102 and a specific data store. For example, a data store specific query 118D may be provided to the data store API 126D associated with the data store 124D of the cloud services provider 120D. In examples, the data store API 126D may provide the keyword(s) to the search service 138D associated with the data store 124D which can determine one or more files that are relevant to the user-provided keyword(s) 103. That is, the search service 138D may search the files 128D based on the keyword(s) 103. The data store API 126D can then provide references to the relevant files as query results 134D. Of course, there can be additional cloud services providers 120 or fewer cloud services provider 120 than that which is depicted in FIG. 1. As previously discussed, the search and file grouping service 116 may not have access to the content in each of the files associated with the cloud services providers 120. Accordingly, the query results 134A-134D may be provided in a list format or otherwise provide an indication, such as a file reference or file identifier, of which files are relevant to the user provided keyword(s) 103. In examples, such list may include a file identifier uniquely identifying a file located and determined to be relevant at a respective data store 124.

The search and file grouping service 116 can receive the query results 134A-134D and perform a matching process to identify which files referenced by the file identifiers in the query results 134A-134D are the same or similar. That is, the search and file grouping service 116 may match or group files that are similar or the same amongst the various different query results 134A-134D that are returned. Once grouped, one or more of the most relevant files may then be displayed at a user interface 106. The user interface 106 may include a first display portion 108, a second display portion 110, and/or a third display portion 112. The first display portion 108 may display representations of files (e.g., filenames and icons) that are determined to be the most relevant files from a first data store (e.g., 124A), whereas the second display portion 110 may display representations of files (e.g., filenames and icons) that are determined to b most relevant files from a second data store (e.g., 126D). In some examples, the third display portion 112 may display representations of files from e-mails (e.g., filenames and icons) that are determined to be the most relevant files from one or more e-mails. In some examples, and as will be discussed herein, the user interface may provide an indication distinguishing relevant files that may include multiple versions from different data stores from other files that are provided from a single data store.

In accordance with examples of the present disclosure, one or more cloud services provider 120A-D may include a search and file grouping service 132. The search and file grouping service 132 located at the cloud services provider 120A-D may receive one or more keyword(s) 103 from the computing device 104 associated with the user 102 as keyword(s) 140, generate data store specific queries 118B, 118C, and 118D, receive query results 134B-134D, and match the query results 134B-134D as previously discussed. The cloud services provider 120A may then make such query results available at the user interface 106. Each of the computing device 104 and the cloud services providers 120A-120D may communicate with one another via the network 136.

Figure 2:
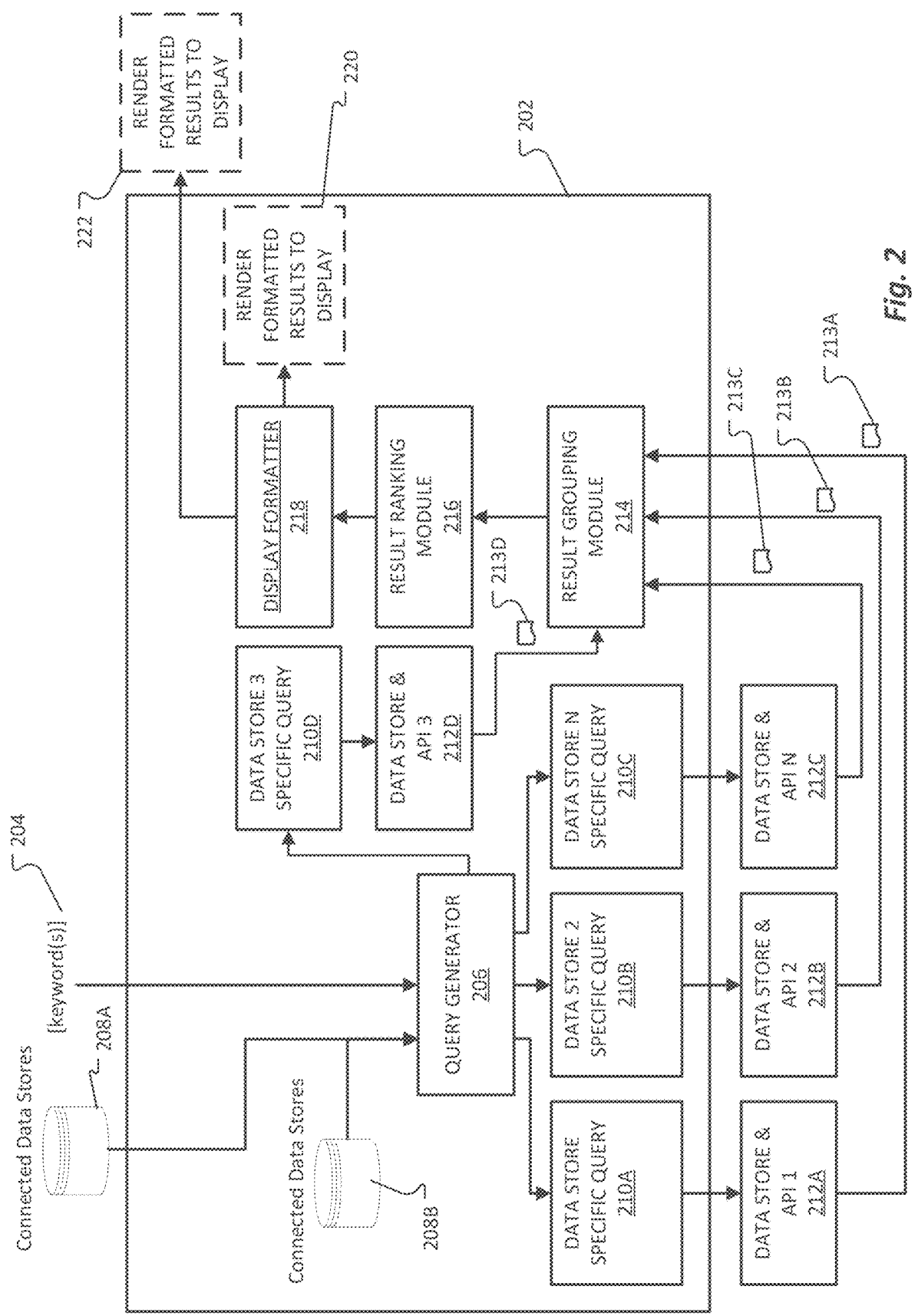
FIG. 2 depicts details of the search and file grouping service in accordance with examples of the present disclosure.

FIG. 2 depicts details of the search and file grouping service 202 in accordance with examples of the present disclosure. The search and file grouping service 202 may be the same as or similar to the search and file grouping service 116 and/or search and file grouping service 132 as previously described. The search and file grouping service 202 may receive the keyword(s) 204 from a user as previously described. Further, one or more connected data store(s) 208A and/or 208B may be received by the query generator 206. In examples, the connected data store(s) 208A may reside external to the search and file grouping service 202 and/or external to a cloud services provider. In some examples, the connected data store(s) 208B may be part of or otherwise stored at the search and file grouping service 202. The query generator 206 can receive the connected data store(s) 208A-B and the keyword(s) 204 and generate data store specific queries 210A-D. in examples, each of the data store specific queries 210A-D are based on requirements of the respective data store & API 212A-D; accordingly, each of the data store specific queries 210A-210D may be different from one another. An example data store specific query may include a token associated with an authenticated user, a text query string including one or more keywords, and in some instances, metadata parameters specifying what kind/type of metadata to return. In examples, the search and file grouping service 202 may reside at a cloud service provider and therefore may generate a data store specific query that is specific to a data store & API 212D that is part of the search and file grouping service 202.

Based on the data store specific queries 210A-D, the respective data store & API 212A-D may provide query results to the result grouping module 214. The result grouping module 214 may determine that a file referenced in a query result from a first data store is the same as or similar to a file reference in a query result from a second data store based on the metadata associated with each file and not the file content. Determining that two files are the same or similar based on metadata is more challenging than using file content, as the metadata describes the file and may be formatted differently depending on data stores. As an example, the data store specific query 210A may be provided to the data store & API 212A; the data store & API 212A may provide a first query result 213A including a list of file identifiers referencing those files located at the data store & API 212A and determined to be relevant to the keyword(s) 204. The data store specific query 210B may be provided to the data store & API 212B; the data store & API 212B may provide a second query result 213B including a list of file identifiers referencing those files located at the data store & API 212B and determined to be relevant to the keyword(s) 204. A file referenced by the first query result 213A may be the same as or similar to a file referenced by the second query result 213B. Accordingly, such files may be grouped together based on a metadata comparison.

In some examples, the grouped files may not be identical but may be determined to be similar and/or related based on metadata that may be returned with the query results 213A-213D. For example, the query generator 206 may generate data store specific queries that not only include the keyword(s) 204, but also include one or more parameters indicating the type of metadata, or metadata fields, to be returned by the data store & API 212 in the query results 213A-D. As an example, a data store & API 212C may return a query results 213C that includes a list of file identifiers referencing those files located at the data store & API 212C along with the metadata fields for each file identifier in the list of file identifier. Thus, while the content of each file referenced by the file identifier in the list of file identifiers returned as the query result 213C may not be directly accessible, metadata—or data describing each respective file may be accessible. Accordingly, the metadata can be used to determine similar or same files beyond just using a filename, which may also be provided as metadata. The metadata fields may include, but are not limited to the last edit time, an author, a timestamp, a file type, a filename, a file location, etc. In some examples, a file may be determined to be the same as or similar to another file based on an amount of overlapping metadata (e.g., three of five fields overlap, seven of 9 fields overlap). In some examples, a file may be determined to be the same as or similar to another file based on an amount of overlap in a specific metadata field (e.g., seventy-five percent of the filename characters are the same, or the first twelve characters of the filename are the same). As previously described, at least one of the data store & API 212A-D may include e-mail attachments including files corresponding to and/or otherwise associated with e-mail belonging to a user. Such e-mail attachments may be matched to other files residing or otherwise located at a different data store.

In examples, the result grouping module 214 may provide a list identifying grouped files to the result ranking module 216. The list identifying grouped files may include a unique identifier identifying each group of file identifiers, where a group of file identifiers may include references to one or more files residing at one or more data stores. In some examples, the one or more data stores may be different data stores. In accordance with examples of the present disclosure, the result ranking module 216 may rank or order each of group with respect to the other groups determined by the result grouping module 214. In some examples, the result ranking module may rank or order each file identifier within each group.

For example, an indication of relevance may be determined based on location of a file identifier within the list provided by the query result 213, where a file identifier appearing at the top or earlier in the list may be more relevant than a file identifier appearing at the bottom or later in the list. In some examples, each file identifier in the list may include a relevancy ranking that is obtained as part of the metadata. Within each group identified by the result grouping module 214, file identifiers within the group may be ranked or ordered amongst each other. For example, a most relevant file identifier may appear closer to the top of the list. In some examples, metadata is used to rank and/or order the files within each group. In addition, and as previously described, each group is ranked with respect to each other group. For example, a composite relevancy score may be determined for each group; based on the composite relevancy score, a group of file identifiers that is determined to be more relevant based on relevancy score may be indicated as being more relevant (e.g., positioned higher in the ranking of groups, assigned a lower-ranked number, or assigned a higher relevancy number). In examples, the composite relevancy score for each group may be based on the relevancy of the documents referenced within the group in addition to metadata. For example, a weighted average based on relevancy, metadata, or other indication of may be used.

The ranked groupings of file identifiers (where in some examples a group may include a single file identifier) are then provided to the display formatter 218. The display formatter 218 may determine how to display the groups referencing files. For example, the groups referencing files may be displayed based on data store, relevancy, file type (e.g., e-mail attachment). The display formatter 218 may then provide the format and the ranked groupings of documents to a display to be rendered (e.g., 220/222).

Figure 3A:
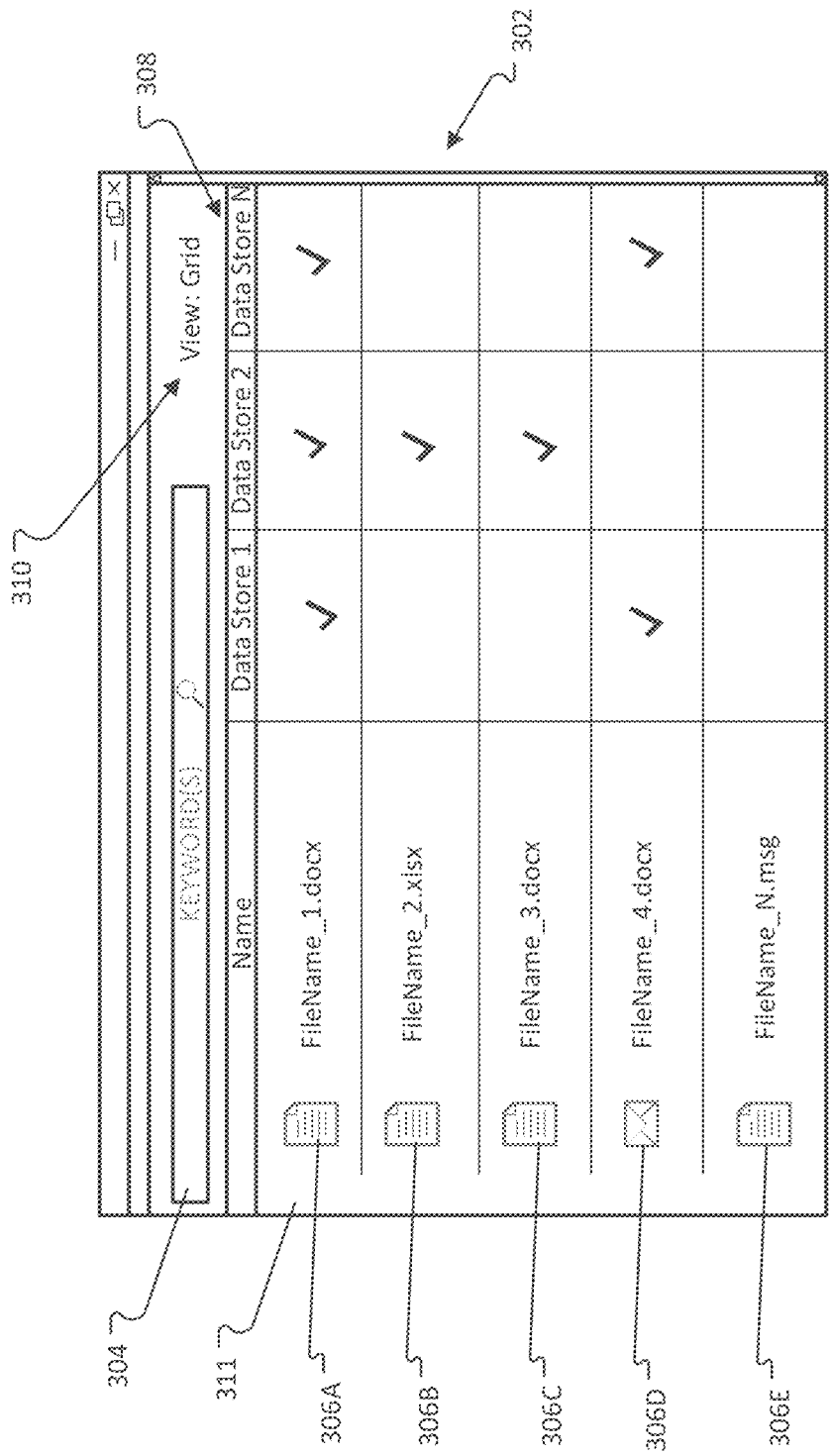
FIG. 3A provides details of a first user interface in accordance with examples of the present disclosure.

FIG. 3A provides details of a first user interface 302 in accordance with examples of the present disclosure. The first user interface 302 may provide a keyword input control 304 such that a user can enter keywords to search multiple disparate data stores. The user interface 302 may provide the query results according to a view control 310. The query results may include a link to a file at a data store based on the file identifier returned in the query results. As an example, in a grid view, the filenames and icons associated with returned query results may be listed in a grid, where a file or referenced filename at the top of the first area 311 is more relevant to the keywords entered into the keyword input control 304 than a file or filename located at the bottom of the first area 311. The first area 311 may display the filenames 306A-306E and may indicate, such as by different icon, whether such file is an e-mail attachment. For example, the file 306D is indicated as being from an e-mail attachment. In some examples, the indication may indicate that the most relevant file is an e-mail attachment even though the same or similar file exists in another data store. For example, the file 306A is included in at least three data stores, but the most relevant file of the three files is not an e-mail attachment. As the view control 310 is user-configurable, the user may change how the documents are displayed.

Figure 3B:
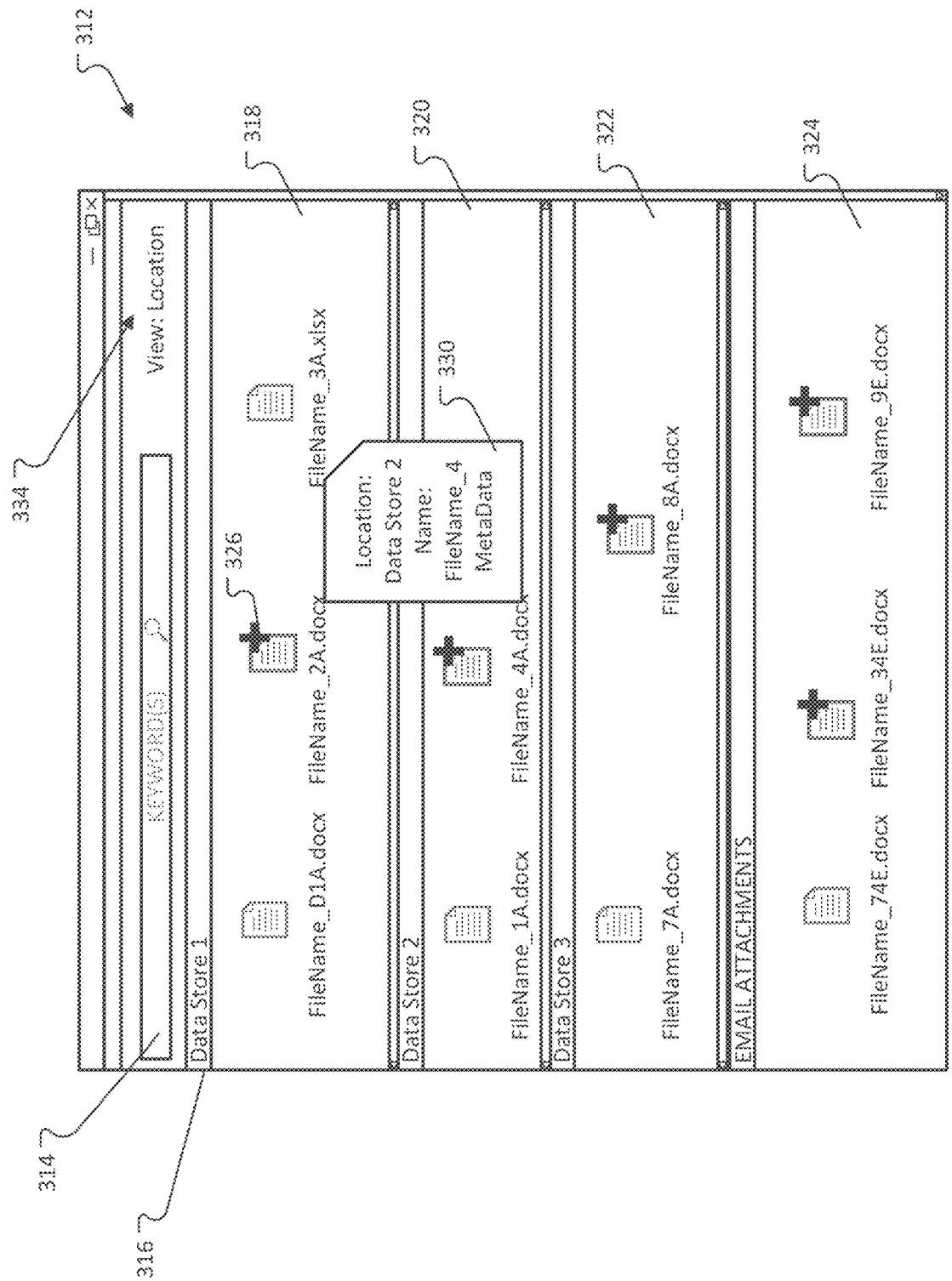
FIG. 3B provides details of a second user interface in accordance with examples of the present disclosure.

For example, and as illustrated in the user interface 312 of FIG. 3B, the displayed files may be displayed in a group based on data store according to the view control 334. That is, a first display area 318 of the user interface 312 may display most relevant files from the data store 1 316. The second display area 320 of the user interface 312 may display most relevant files from the data store 2. The third display area 322 of the user interface 312 may display most relevant files from the data store 3. The fourth display area 324 of the user interface 312 may display e-mail attachments. In examples, where a most relevant file resides in a display area, such as the first display area 318, and the displayed filename and/or icon is indicated as being associated with multiple files and/or data stores, the displayed filename and/or icon may include an indication indicating that additional versions of the file exist and/or that the file is available at additional locations. For example, the icon for the file 326 indicates that the file is available at another location in addition to being located at the data store 1 316. In some examples, additional information 330 about each, or group of files, may be available upon a specific user action, for example a hover above or click on the file.

Figure 3C:
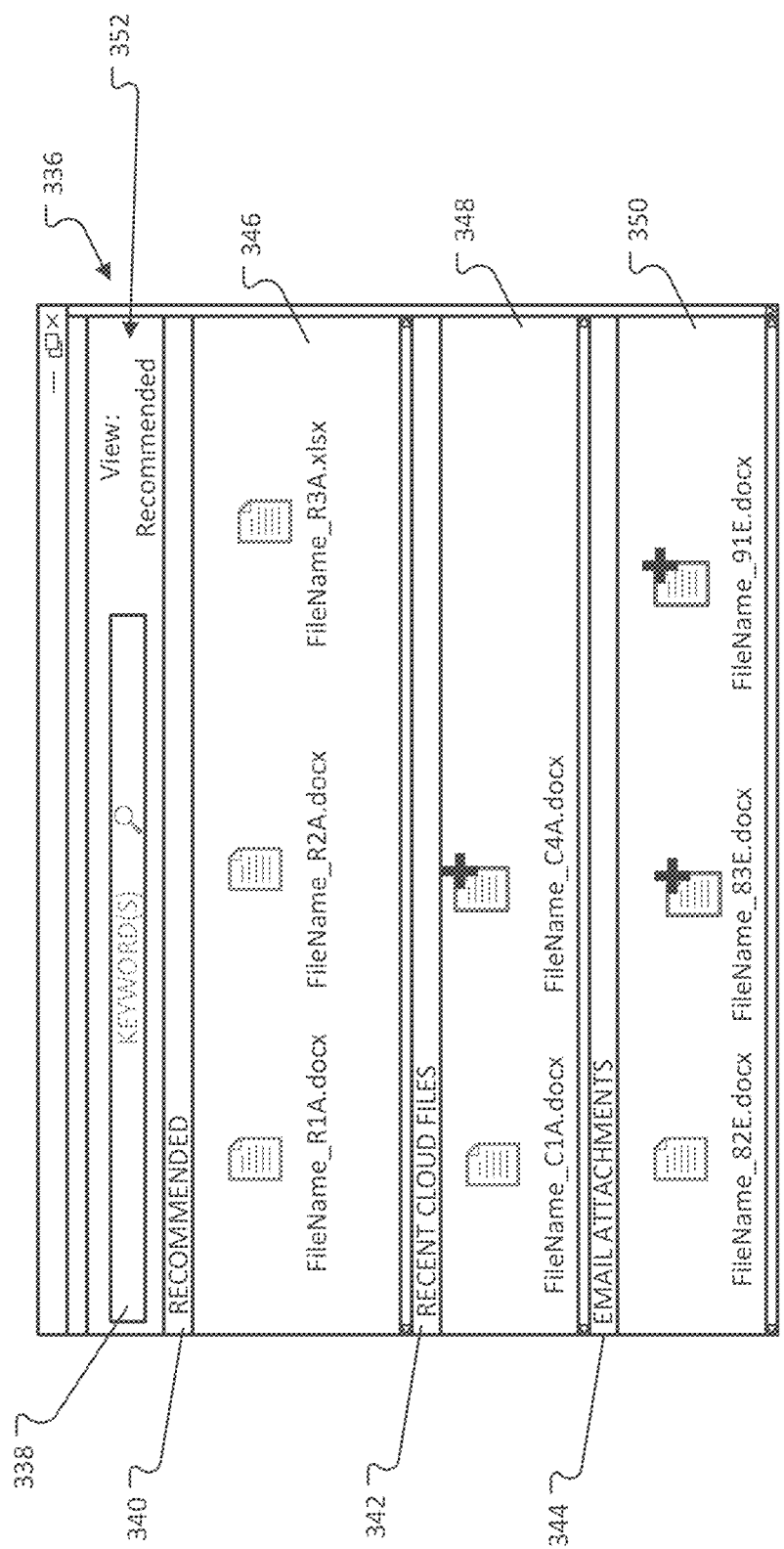
FIG. 3C provides details of a third user interface in accordance with examples of the present disclosure.

In some examples, and as depicted in FIG. 3C, the user interface 336 may display files or icons in a first display area 346, a second display area 348, and a third display area 350 according to other criteria. For example, a view control 352 may be configured to "recommended" by a user such that recommended documents 340 based on one or more keywords entered into the keyword input 338 are displayed in the first display area 346, recent files 342 from a plurality of data stores are displayed in the second display area 348, and e-mail attachments 344 are displayed in a third display area 350.

Figure 4:
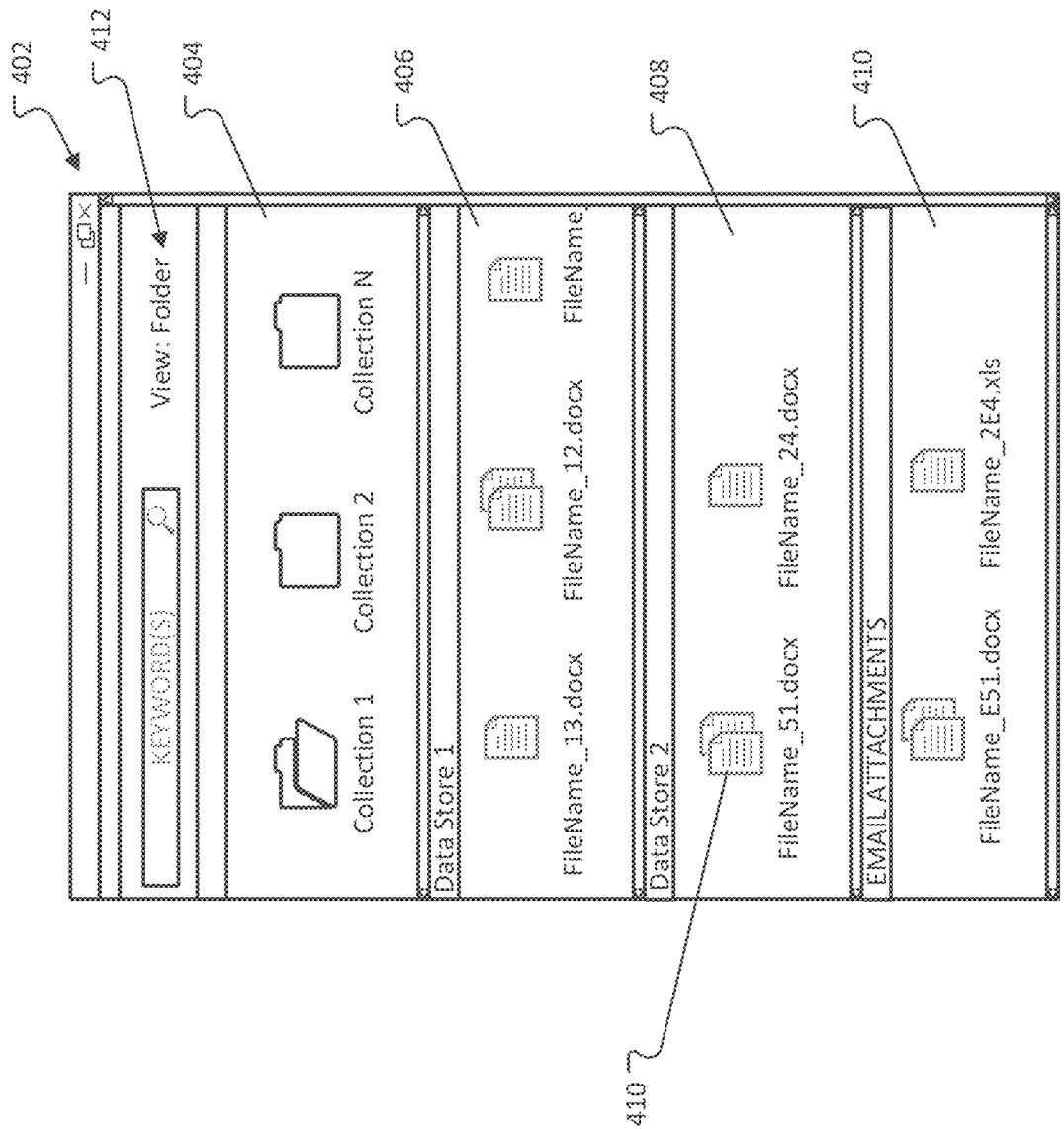
FIG. 4 depicts an example user interface for displaying files according to one or more file collections in accordance with examples of the present disclosure.

FIG. 4 depicts an example user interface 402 for displaying files according to one or more file collections in accordance with examples of the present disclosure. A user may configure the view control 412 to "folder view" such that files having similar characteristics are displayed in grouped view. For example, different file collections may be displayed in a first display area 404. Each file collection may include files matching one or more criteria, such as but not limited to the same file author, the same e-mail recipient, the same e-mail sender, the most recently accessed files, and/or other user configured filter parameters. As the files are displayed according to a selected view, a file may belong to multiple collections. As depicted in FIG. 4, a "collection 1" file collection is opened, and the results are displayed as being grouped according to data store and/or data source. For example, a second display area 406 may include files from data store 1; the third display area 408 may include files from data store 2, and the fourth display area 410 may include files that are e-mail attachments. As previously discussed, each of the display areas may display those files most relevant to the collection parameters. For example, the second display area 406 may display those files from the data store 1 that are most relevant to one or more collection parameters (e.g., the same file author, the same e-mail recipient, the same e-mail sender, the most recently accessed files, and/or other user configured filter parameters.) In some examples, the icon displayed that is associated with a file may indicate that another file that is the same as or similar to the displayed file exists in another data store. For example, the icon 414 indicates that another file is located in another data store.

Figure 5A:
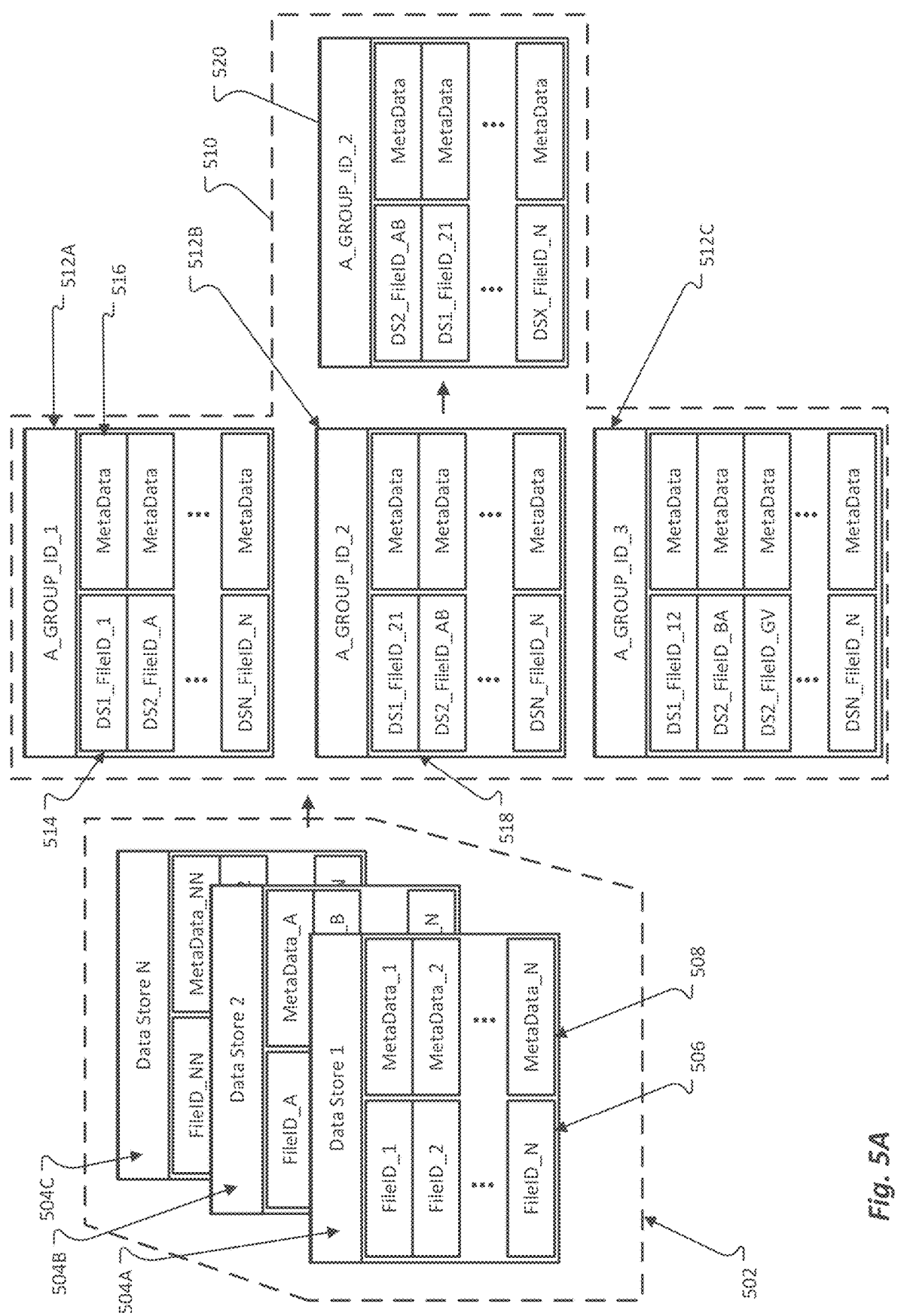
FIG. 5A depicts a first example of a query result in accordance with examples of the present disclosure.

FIG. 5A depicts an example of a query result 502 in accordance with examples of the present disclosure. The query result 502 for a plurality of data stores may include a first data store specific query result 504A corresponding to a first data store (e.g., data store 1), a second data store specific query result 504B corresponding to a second data store (e.g., data store 2), and another data store specific query result 504C corresponding to another data store (e.g., data store N). Each of the data store specific query results 504A-504C may include a file identifier 506 and metadata 508. The file identifier 506 may reference a file located at the respective data store. For example, the file identifier 506 may refer to a file location (absolute or relative) or another file identifier local to the respective data store. The metadata 508 may include metadata describing the file to which the file identifier 506 refers. The metadata may include, but is not limited to a creation time, an author, a machine id corresponding to a computing device at which the file was created, an edit time, the last access time, a search relevancy corresponding to a specific keyword search, a file type, a filename, etc. The order in which the file identifiers 506 are provided may correspond to an order of relevance to the keywords provided by a user as previously described. For example, the file identifier "FileID_1" may refer to a file in the "Data Store 1" that is more relevant to keywords provided by a user than the file referenced by the file identifier "FileID_2."

As further provided in FIG. 5A, the query result 502 may be grouped by a result grouping module, such as the result grouping module 214 (FIG. 2). In examples, the result grouping module may provide a list of grouped file references 510 corresponding to grouped files. For example, a first group identifier 512A may be included in the list of file references 510. The first group identifier 512A may include a plurality of file references 514 corresponding to files identified in the data store specific query results 504A-C. In examples, the metadata 516 corresponding to each of the file references 514 may also be included. The first group identifier 512A may be used to identify a group of files that are the same or similar That is, a file referenced by "DS1_FileID_1" from the data store specific query result 504A may be the same as or similar to the file referenced by "DS2_FileID_A" from the data store specific query result 504B. As previously mentioned, one or more file identifiers from the data store specific query results 504A-C may be associated with the group identifiers 512A-C.

As another example, the second group identifier 512B may include a plurality of file references 518 corresponding to files identified in the data store specific query results 504A-C. The second group identifier 512B may be used to identify a group of files that are the same or similar That is, file referenced by "DS1_FileID_21" from the data store specific query result 504A may be the same as or similar to the file referenced by "DS2_FileID_AB" from the data store specific query result 504B. In examples, the plurality of file references 518 within a file group, such as the group identified by the second group identifier 512B, may be ordered or ranked according to a relevancy of each respective file. For example, the plurality of file references 518 may be arranged as depicted by the group identified by the group identifier 520. Although the group identifier 512B and 520 are depicted as being the same, the plurality of file references associated with the group identifier 520 are in a different order. Such order may correspond to a relevancy of each referenced file to keywords provided by a user. As further depicted in FIG. 5A, a group associated with a group identifier may include multiple files from the same data store.

Figure 5B:
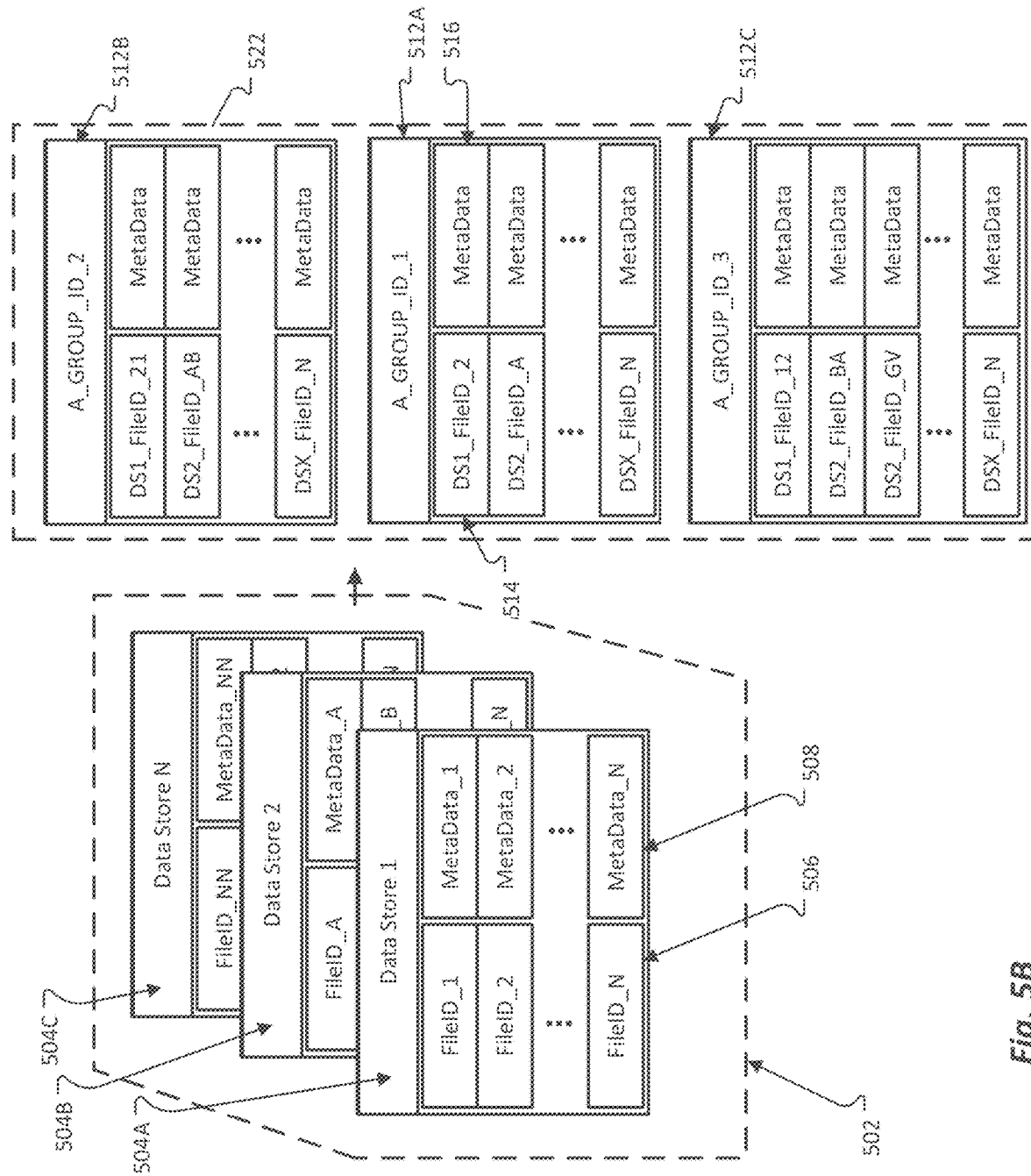
FIG. 5B depicts a second example of a query result in accordance with examples of the present disclosure.

As depicted in FIG. 5B, the group identifiers 512A-C in the list of file references 510 may be ordered or ranked according to a relevancy of the plurality of file references 514 corresponding to files identified in the respective data store specific query results 504A-504C. For example, a composite relevancy score for the representation of the relevancy of the files corresponding to the plurality of file references 514 may be generated for each group of files associated with respective group identifiers 512A-C. Thus, the group associated with the A_Group_ID_2 group identifier may be more relevant than the group associated with the A_Group_ID_2 group identifier. Accordingly, ranked results 522 may be provided to a user for display.

Figure 6:
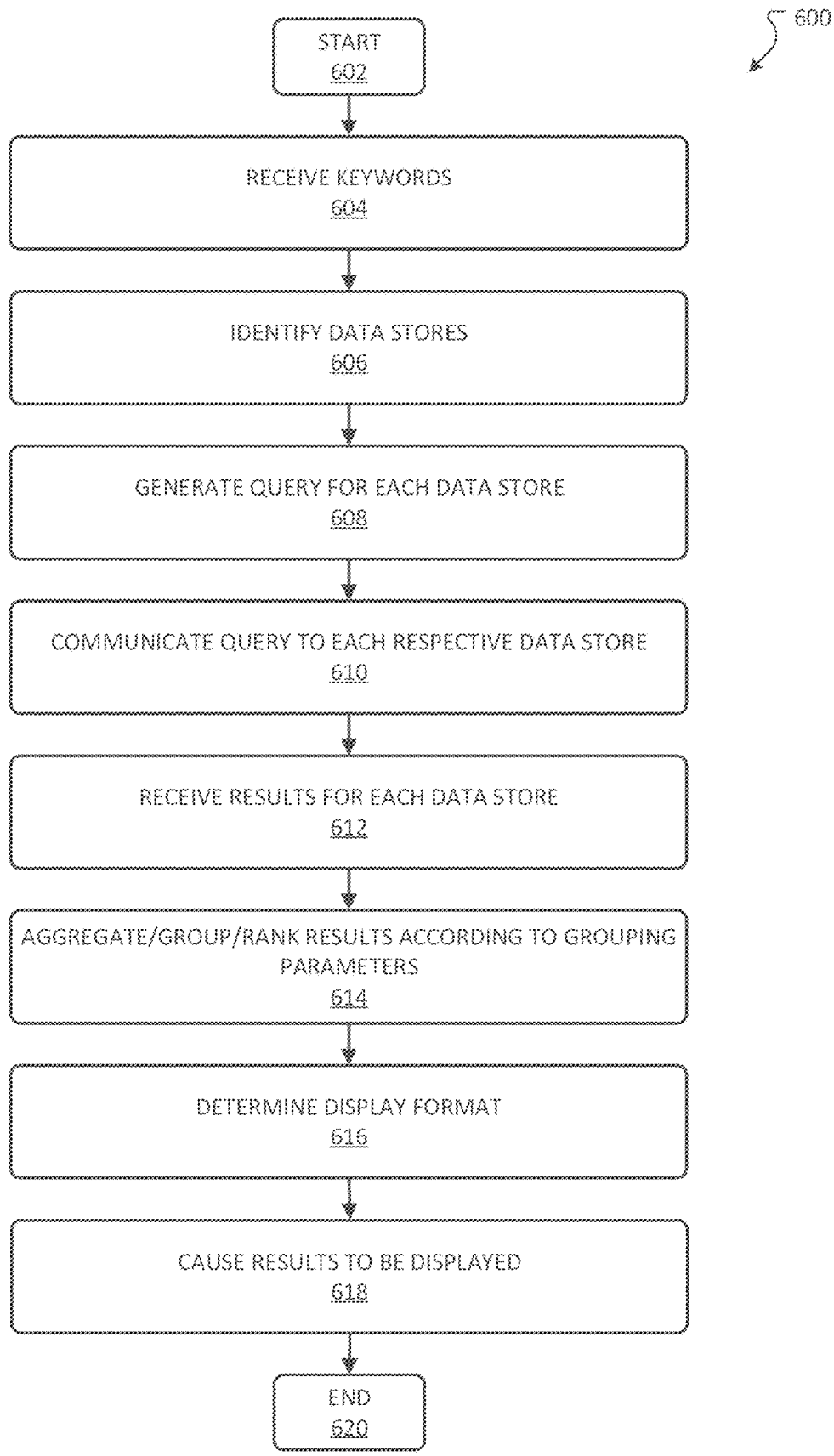
FIG. 6 depicts details of a method for identifying files across disparate data sources and then presenting the files to a user interface in accordance with examples of the present disclosure.

FIG. 6 depicts details of a method 600 for identifying files across disparate data sources and then presenting the files to a user interface in accordance with examples of the present disclosure. A general order for the steps of the method 600 is shown in FIG. 6. Generally, the method 600 starts at 602 and ends at 620. The method 600 may include more or fewer steps or may arrange the order of the steps differently than those shown in FIG. 6. The method 600 can be executed as a set of computer-executable instructions executed by a computer system and encoded or stored on a computer-readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method starts at 602, where flow may proceed to 604. At 604, one or more keywords are received from a user. For example, a user may enter keywords into a keyword input, such as the keyword input control 304. At 606, one or more connected data store(s) may be identified. In examples, a list of connected data store(s) may be received at 606. At 608, a query generator, such as the query generator 206 can receive the list of connected data store(s) and the keyword(s) from the user and generate data store specific queries. In examples, each of the data store specific queries are based on requirements and specifications of the respective data store and an API allowing access to the respective data store.

The data store specific queries may be communicated to the API of the respective specific data store at 610. The method 600 may proceed to 612, where the respective data store and/or the API associated with the respective data store may provide query results that are received at 612. As previously discussed, the query results may correspond to data store specific query results, such as the data store specific query results 504A-C corresponding to a first data store (e.g., data store 1), a second data store (e.g., data store 2), and another data store (e.g., data store N). The method may proceed to 614, where the data store specific query results may be grouped. For example, a file referenced by a first data store specific query result may be the same as or similar to a file referenced by a second data store specific query result. Accordingly, such files may be grouped together. In some examples, the grouped files may not be identical but may be determined to be similar and/or related based on metadata that may be returned with the query results. In accordance with examples of the present disclosure, a result ranking module, such as the result ranking module 216, may rank each group of files with respect to the other group of files based on a relevancy of the group of files to the keywords provided by the user. In some examples, such ranking may be based on a composite relevancy score; the composite score may correspond to an average relevancy or time-dependent average relevancy (e.g., a file relevance may decrease based on an amount of time since received). In some examples, each file identifier within each group may be individually ranked according to the file identifiers within the group and metadata associated with each file identifier.

The method 600 may proceed to 616 where a display format may be determined. In examples, the display format may correspond to a user-selected and/or user-configured view. At 618, the ranked groups of file identifiers are provided to a user interface where they may be rendered and displayed to a user. The method 600 may end at 620.

Figure 7:
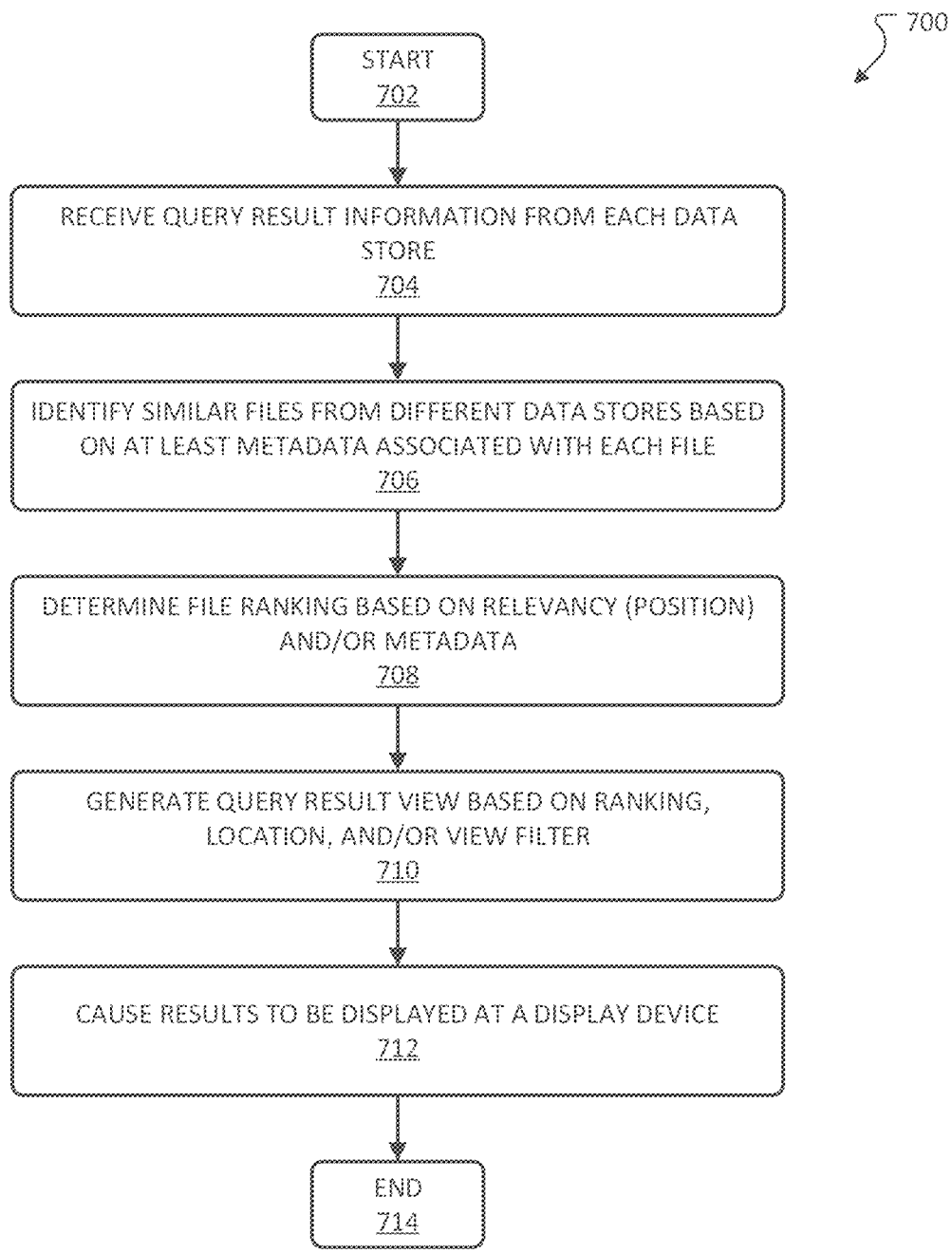
FIG. 7 depicts details of a method for grouping and ranking query results in accordance with examples of the present disclosure.

FIG. 7 depicts details of a method 700 for grouping and ranking query results in accordance with examples of the present disclosure. A general order for the steps of the method 700 is shown in FIG. 7. Generally, the method 700 starts at 702 and ends at 714. The method 700 may include more or fewer steps or may arrange the order of the steps differently than those shown in FIG. 7. The method 700 can be executed as a set of computer-executable instructions executed by a computer system and encoded or stored on a computer-readable medium. In examples, aspects of the method 700 are performed by one or more processing devices, such as a computer or server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method starts at 702, where flow may proceed to 704. At 704, each of the respective data store and/or the API associated with respective data stores may provide query results which are received. As previously discussed, the query results may correspond to data store specific query results, such as the data store specific query results 504A-C corresponding to a first data store (e.g., data store 1), a second data store (e.g., data store 2), and another data store (e.g., data store N). The method may proceed to 706, where the data store specific query results may be grouped. For example, a file referenced by a first data store specific query result may be the same as or similar to a file referenced by a second data store specific query result. Accordingly, such file identifiers may be grouped together.

In some examples, the group of file identifiers may reference files that may not be identical but may be determined to be similar and/or related based on metadata that may be returned with the query results.

For example, data store specific queries that not only include the keyword(s), but also include one or more parameters indicating the type of metadata or metadata field to be returned by the data store API may be included. Thus, while the content of each file referenced by the file identifier in the list of file identifiers returned as a data store specific query result may not be directly accessible, metadata—or data describing each respective referenced file may be accessible. Accordingly, the metadata can be used to determine similar or same files beyond just using a filename and file type. The metadata may include, but is not limited to a creation time, an author, a machine id corresponding to a computing device at which the file was created, an edit time, a last access time, a search relevancy corresponding to a specific keyword search, a file type, a file name, and a timestamp, etc.

The method 700 may proceed to 708 where the order in which the group identifiers and/or the file identifiers are arranged may be modified to correspond to an order of relevance to keywords provided by a user as previously described. For example, an indication of relevance may be determined based on location within the data store specific query result, where a file identifier appearing at the top or earlier in the query result list may be more relevant than a file identifier appearing at the bottom or later in the query result list. In some examples, each returned file identifier in the query result list may include a relevancy ranking as part of the metadata. Accordingly, each file identifier within the grouping determined by the group identifier may be individually ranked or ordered amongst each other based on relevancy and/or metadata (e.g., a more recent timestamp may indicate that the file referenced by the file identifier is more relevant than another timestamp). Therefore, a most relevant file identifier may appear closer to the top of the list. In some examples, additional metadata is used to rank files within each group. In addition, and as previously described, each group is ranked with respect to each other group. For example, a relevancy score may be determined for each group; based on the relevancy score, a group that is more relevant may be indicated as being more relevant (e.g., positioned higher in ranking of groups, assigned a lower-ranked number, or assigned a higher relevancy number). In examples, the relevancy for each group may be based on a composite relevancy score determined by files referenced by the file identifiers within the group. For example, a weighted average based on relevancy, metadata, or other indication of may be used.

The method 700 may proceed to 710 where a query result view may be generated based on the ranked groupings of file identifiers, location of the files, and/or a view configuration as configured by a user. The method 700 may then proceed to 712 where the results as determined by the query result view are caused to be rendered to a user interface and displayed to a user on a display device. The method 700 may end at 714.

Figure 8:
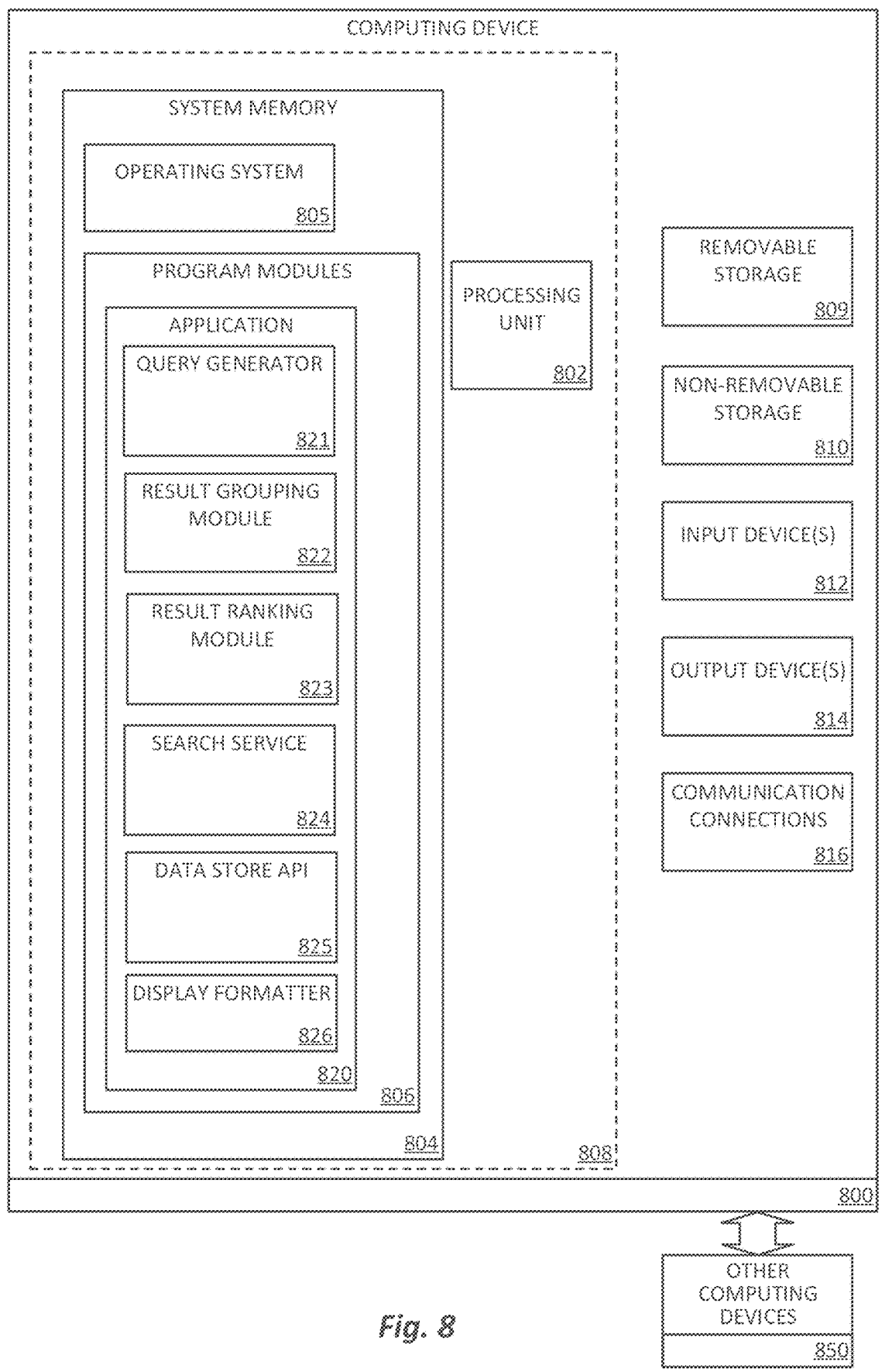
FIG. 8 depicts a block diagram illustrating physical components of a computing system with which aspects of the disclosure may be practiced.

FIG. 8 is a block diagram illustrating physical components (e.g., hardware) of a computing system 800 with which aspects of the disclosure may be practiced. The computing system components described below may be suitable for the computing and/or processing devices described above. In a basic configuration, the computing system 800 may include at least one processing unit 802 and a system memory 804. Depending on the configuration and type of computing system, the system memory 804 may comprise, but is not limited to, volatile storage (e.g., random-access memory (RAM)), nonvolatile storage (e.g., read-only memory (ROM)), flash memory, or any combination of such memories.

The system memory 804 may include an operating system 805 and one or more program modules 806 suitable for running software application 820, such as one or more components supported by the systems described herein. As examples, system memory 804 may include the query generator 821, a result grouping module 822, a result ranking module 823, a search service 824, a data store API 825, and a display formatter 826. The query generator 821 may be the same as or similar to the query generator 206 as previously described. The result grouping module 822 may be the same as or similar to the result grouping module 214 previously described. The result ranking module 823 may be the same as or similar to the result ranking module 216 as previously described. The data store API 825 may be the same as or similar to the data store API 126 and 212 as previously described. The display formatter 826 may be the same as or similar to the display formatter 218 as previously described. In examples, the search and file grouping service 132 and/or the search and file grouping service 116 may include one or more of the program modules 806. The operating system 805, for example, may be suitable for controlling the operation of the computing system 800.

Furthermore, embodiments of the disclosure may be practiced in conjunction with a graphics library, other operating systems, or any other application program and are not limited to any particular application or system. This basic configuration is illustrated in FIG. 8 by those components within a dashed line 808. The computing system 800 may have additional features or functionality. For example, the computing system 800 may also include additional data storage devices (removable and/or non-removable) such as magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., software applications 820) may perform processes including, but not limited to, the aspects as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit, discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such a SOC device may include one or more processing units, graphics units, communications units, system virtualization units, and various application functionality, all of which are integrated (or "burned") onto the chip substrate as a single integrated circuit. When operating via a SOC, the functionality described herein, with respect to the capability of the client to switch protocols, may be operated via application-specific logic integrated with other components of the computing system 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 800 may also have one or more input device(s) 812 such as a keyboard, a mouse, a pen, a sound or voice input device, a touch or swipe input device, etc. The output device(s) 814, such as a display, speakers, a printer, etc., may also be included. The aforementioned devices are examples, and others may be used. The computing system 800 may include one or more communication connections 816, allowing communications with other computing systems 850. Examples of suitable communication connections 916 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable, and non-removable media implemented in any method or technology for storage of information, such as computer-readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage, or other magnetic storage devices, or any other article of manufacture which can be used to store information, and which can be accessed by the computing system 900. Any such computer storage media may be part of the computing system 800. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
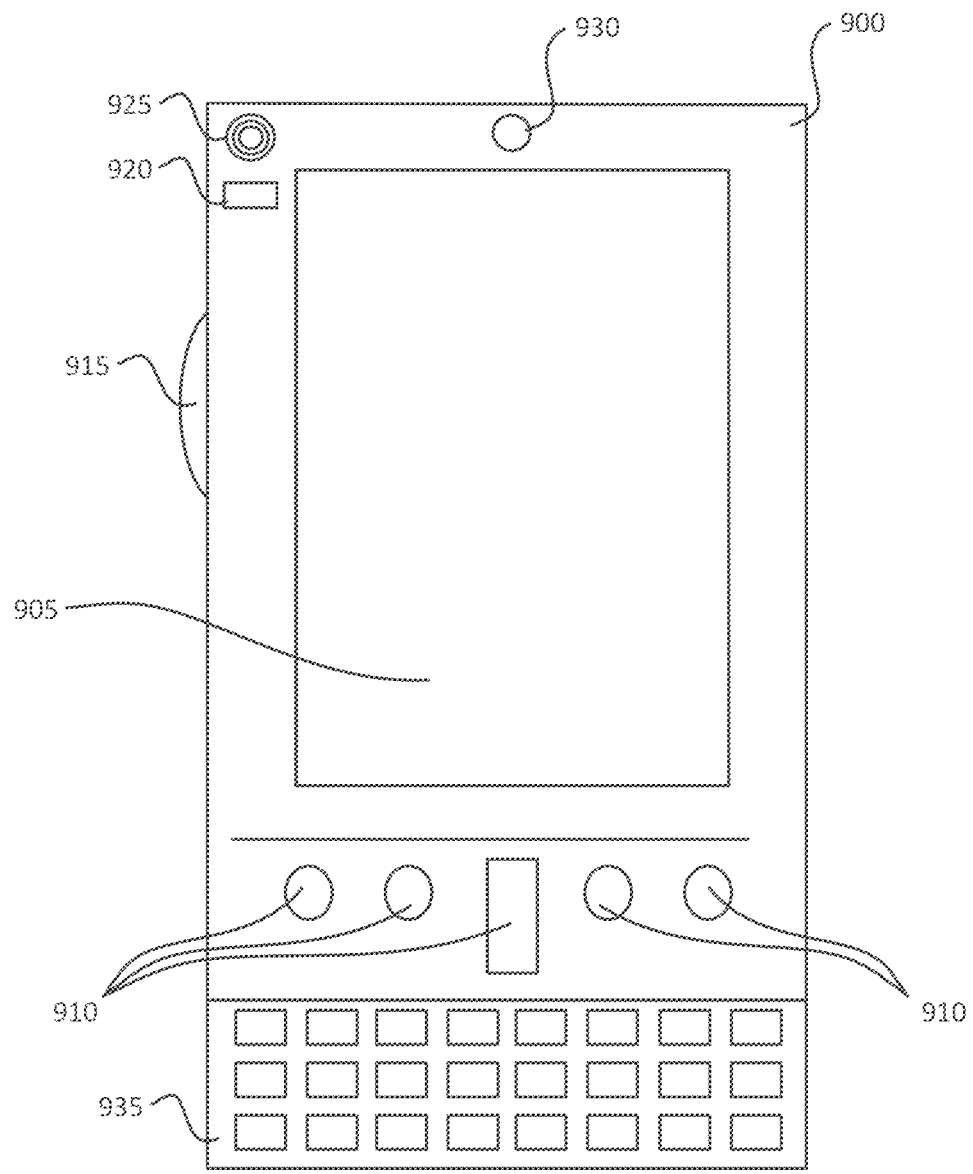
FIGS. 9A-9B depict details of one or more computing systems in accordance with examples of the present disclosure.
Figure 9B:
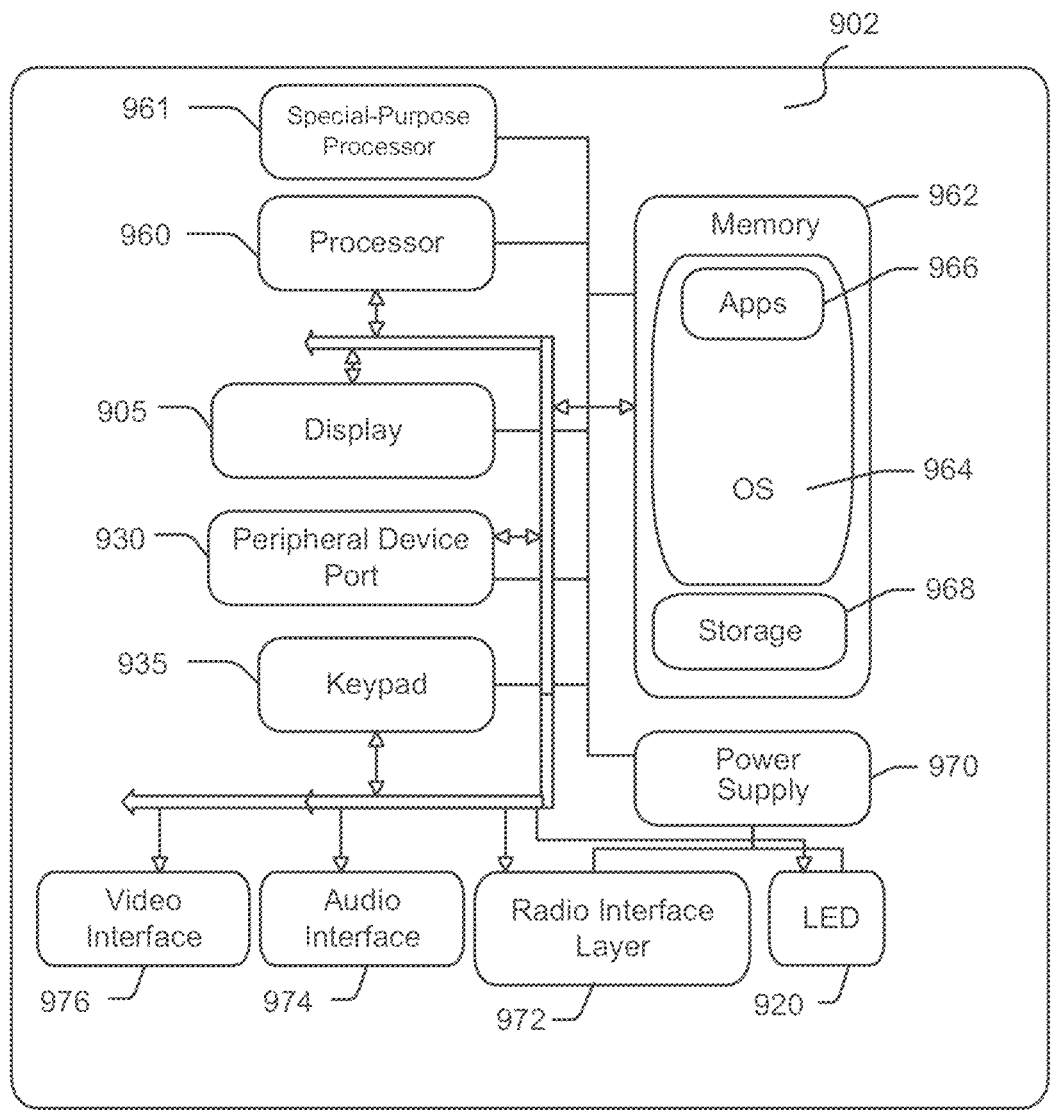

FIGS. 9A-9B illustrate a computing system 900, for example, a mobile telephone, a smart phone, wearable computer (such as a smart watch), a tablet computer, a desktop computer, a laptop computer, and the like, with which embodiments of the disclosure may be practiced. With reference to FIG. 9A, one aspect of a computing system 900 for implementing the aspects is illustrated. In a basic configuration, the computing system 900 is a desktop computer having both input elements and output elements. The computing system 900 typically includes a display 905, which may also function as an input device (e.g., a touch screen display). The computing system 900 may also include a keypad 935. The keypad 935 may be a physical keypad or a "soft" keypad generated on the touch screen display.

In various embodiments, the output elements include the display 905 for showing a graphical user interface (GUI), a visual indicator 920 (e.g., a light-emitting diode), and/or an audio transducer 925 (e.g., a speaker). In yet another aspect, the computing system 900 incorporates input and/or output ports, such as an audio input (e.g., a microphone jack), an audio output (e.g., a headphone jack), and a video output (e.g., an HDMI port) for sending signals to or receiving signals from an external device.

FIG. 9B is a block diagram illustrating the architecture of one aspect of a mobile computing system. That is, the computing system 900 can incorporate a system (e.g., an architecture) 902 to implement some aspects. In one embodiment, system 902 is implemented as a "computing system" capable of running one or more applications (e.g., browser, e-mail, calendaring, contact managers, messaging clients, games, and media clients/players). In some aspects, system 902 is integrated as a computing system, such as a desktop computer.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, maps programs, and so forth. System 902 also includes a nonvolatile storage area 968 within the memory 962. The nonvolatile storage area 968 may be used to store persistent information that should not be lost if the system 902 is powered down. The application programs 966 may use and store information in the nonvolatile storage area 968, such as e-mail or other messages used by an e-mail application, and the like. A synchronization application (not shown) also resides on system 902 and is programmed to interact with a corresponding synchronization application resident on a host computer to keep the information stored in the nonvolatile storage area 968 synchronized with corresponding information stored at the host computer. As should be appreciated, other applications may be loaded into the memory 962 and run on the computing system 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world" via a communications carrier or service provider. Transmissions to and from the radio interface layer 972 are conducted under the control of the operating system 964. In other words, communications received by the radio interface layer 972 may be disseminated to the application programs 966 via the operating system 964, and vice versa.

The system 902 may further include a video interface 976 that enables an operation of an on-board camera 930 to record still images, video stream, and the like. A computing system 900 implementing the system 902 may have additional features or functionality. For example, the computing system 900 may also include additional data storage devices (removable and/or non-removable) such as magnetic disks, optical disks, or tape. Such additional storage is illustrated in FIG. 9B by the nonvolatile storage area 968.

Data/information generated or captured by the computing system 900 and stored via the system 902 may be stored locally on the computing system 900, as described above, or the data may be stored on any number of storage media that may be accessed by the device via the radio interface layer 972 or via a wired connection between the computing system 900 and a separate computing system associated with the computing system 900, for example, a server computer in a distributed computing network, such as the Internet. As should be appreciated, such data/information may be accessed via the computing system 900 via the radio interface layer 972 or via a distributed computing network. Similarly, such data/information may be readily transferred between computing systems for storage and use according to well-known data/information transfer and storage means, including electronic mail and collaborative data/information sharing systems.

Figure 10:
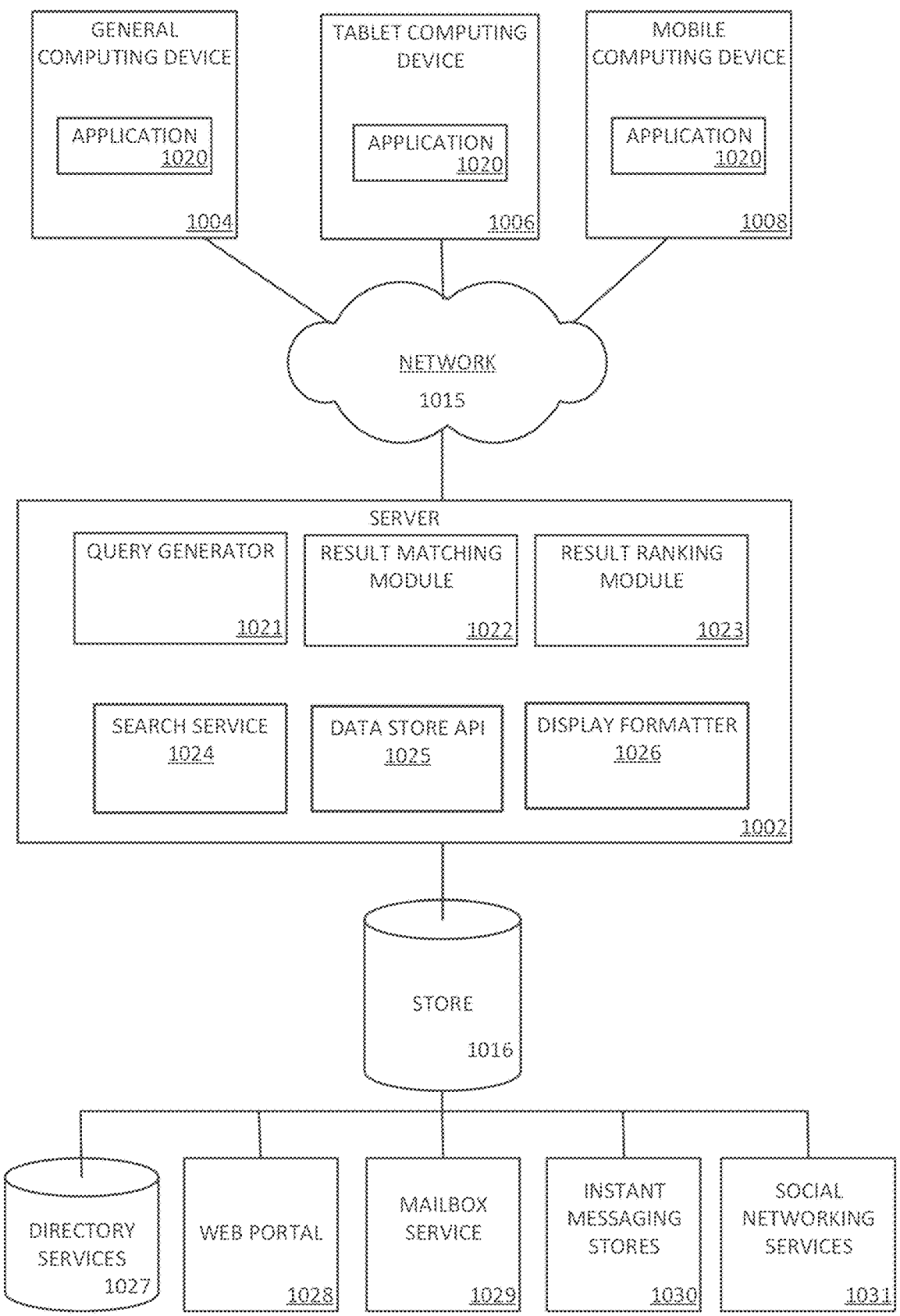
FIG. 10 depicts an architecture of a system for processing data received at a computing system in accordance with examples of the present disclosure.

FIG. 10 illustrates one aspect of the architecture of a system for processing data received at a computing system from a remote source, such as a personal computer 1004, a tablet computing device 1006, or mobile computing device 1008, as described above. Content at a server device 1002 may be stored in different communication channels or other storage types. For example, various files may be stored using a directory service 1027, a web portal 1028, a mailbox service 1029, an instant messaging store 1030, or social networking services 1031.

One or more of the previously described program modules 806 or software applications 820 may be employed by server device 1002 and/or the personal computer 1004, a tablet computing device 1006, or mobile computing device 1008, as described above. For example, the server device 1002 may include a query generator 1021, a result grouping module 1022, a result ranking module 1023, a search service 1024, a data store API 1025, and a display formatter 1026. The query generator 1021 may be the same as or similar to the query generator 206 as previously described. The result grouping module 1022 may be the same as or similar to the result grouping module 214 previously described. The result ranking module 1023 may be the same as or similar to the result ranking module 216 as previously described. The data store API 1025 may be the same as or similar to the data store API 126 and 212 as previously described. The display formatter 1026 may be the same as or similar to the display formatter 218 as previously described. In examples, the search and file grouping service 132 and/or the search and file grouping service 116 may include one or more of the program modules 806 employed by the server device 1002.

The server device 1002 may provide data to and from a client computing device such as a personal computer 1004, a tablet computing device 1006, and/or a mobile computing device 1008 (e.g., a smart phone) through a network 1015.

By way of example, the computer system described above may be embodied in a personal computer 1004, a tablet computing device 1006, and/or a mobile computing device 1008 (e.g., a smart phone). Any of these embodiments of the computing devices may obtain content from the store 1016, in addition to receiving graphical data useable to be either pre-processed at a graphic-originating system or post-processed at a receiving computing system.

In accordance with examples of the present disclosure, a method for grouping and displaying query results from multiple data stores is described. The method may include receiving a keyword as an input; determining a plurality of data stores to search utilizing the received keyword, wherein each data store of the plurality of data stores includes a different search index; generating a data store specific query for each data store of the plurality of data stores; receiving results from each data store based on the respective data store specific query, wherein results from each data store include a plurality of file identifiers identifying files located at the respective data store that are relevant to the keyword; receiving metadata associated with each file identifier of the plurality of file identifiers; grouping the results from each data store into a plurality of groups based on the metadata associated with each file identifier of the plurality of file identifiers; ranking the plurality of groups based on a relevancy associated with each group; and causing information associated with a ranked group of the ranked plurality of groups to be displayed at a user interface.

In some aspects of the above method, grouping the results includes identifying similar or same files referenced by the file identifiers from two or more data stores of the plurality of data stores. In some aspects of the above method, at least one group of the plurality of groups includes a file identifier referencing a file at a first data store of the plurality of data stores and at least one group of the plurality of groups includes a file identifier referencing a file that is an e-mail attachment at a second data store of the plurality of data stores. In some aspects of the above method, the plurality of data stores includes a first data store and a second data store that is different from the first data store. In some aspects of the above method, the method includes formatting the ranked plurality of groups according to a user selected view. In some aspects of the above method, the method includes causing an icon associated with the ranked group of the ranked plurality of groups to be displayed at the user interface, wherein the icon includes a visual identifier visually identifying data stores corresponding to a location at which the displayed information associated with the ranked group of the ranked plurality of groups is stored. In some aspects of the above method, ranking the plurality of groups based on the relevancy associated with each group is based on a common metadata feature. In some aspects of the above method, the method further includes causing a first filename associated with a first ranked group of the ranked plurality of groups to be displayed at a first panel of the user interface and causing a second filename associated with a second ranked group of the ranked plurality of groups to be displayed at a second panel of the user interface, wherein the first panel and second panel are associated with different data stores. In some aspects of the above method, the relevancy associated with each group is based on at least one of a relevancy associated with individual file identifiers of the plurality of file identifiers within the respective group or metadata associated with individual file identifiers of the plurality of file identifiers within the respective group. In some aspects of the above method, at least one group of the plurality of groups includes multiple file identifiers referencing the same or similar files at different data stores.

In accordance with examples of the present disclosure, a system for grouping and displaying query results from multiple data stores is described. The system may include a processor and memory including instructions which when executed by the processor, cause the processor to: receive from an input device, a keyword; determine a plurality of data stores to search utilizing the received keyword, wherein each data store of the plurality of data stores includes a different search index; generate a data store specific query for each data store of the plurality of data stores; receive results from each data store based on the respective data store specific query, wherein results from each data store include a plurality of file identifiers identifying files located at the respective data store that are relevant to the keyword; receive metadata associated with each file identifier of the plurality of file identifiers; group the results from each data store into a plurality of groups based on the metadata associated with each file identifier of the plurality of file identifiers; rank the plurality of groups based on a relevancy associated with each group; and cause information associated with a ranked group of the ranked plurality of groups to be displayed at a user interface.

In some aspects of the above system, the results are grouped by identifying similar or same files referenced by the file identifiers from two or more data stores of the plurality of data stores. In some aspects of the above system, at least one group of the plurality of groups includes a file identifier referencing a file at a first data store of the plurality of data stores and at least one group of the plurality of groups includes a file identifier referencing a file that is an e-mail attachment at a second data store of the plurality of data stores. In some aspects of the above system, the plurality of data stores includes a first data store and a second data store that is different from the first data store. In some aspects of the above system, the instructions cause the processor to format the ranked plurality of groups according to a user selected view. In some aspects of the above system, the instructions cause the processor to cause an icon associated with the ranked group of the ranked plurality of groups to be displayed at the user interface, wherein the icon includes a visual identifier visually identifying data stores corresponding to a location at which the displayed information associated with the ranked group of the ranked plurality of groups is stored. In some aspects of the above system, ranking the plurality of groups based on the relevancy associated with each group is based on a common metadata feature.

In accordance with examples of the present disclosure, a computer-readable storage medium is described. The computer-readable storage medium may include instructions, which when executed by a processor, cause the processor to: receive from an input device, a keyword; determine a plurality of data stores to search utilizing the received keyword, wherein each data store of the plurality of data stores includes a different search index; generate a data store specific query for each data store of the plurality of data stores; receive results from each data store based on the respective data store specific query, wherein results from each data store include a plurality of file identifiers identifying files located at the respective data store that are relevant to the keyword; receive metadata associated with each file identifier of the plurality of file identifiers; group the results from each data store into a plurality of groups based on the metadata associated with each file identifier of the plurality of file identifiers; rank the plurality of groups based on a relevancy associated with each group; and cause information associated with a ranked group of the ranked plurality of groups to be displayed at a user interface.

In some aspects of the above computer-readable storage medium, at least one group of the plurality of groups includes a file identifier referencing a file at a first data store of the plurality of data stores and at least one group of the plurality of groups includes a file identifier referencing a file that is an e-mail attachment at a second data store of the plurality of data stores. In some aspects of the above computer-readable storage medium, the plurality of data stores includes a first data store and a second data store that is different from the first data store.

In addition, the aspects and functionalities described herein may operate over distributed systems (e.g., cloud-based computing systems), where application functionality, memory, data storage, and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced includes keystroke entry, touch screen entry, voice or other audio entry, gesture entry where an associated computing device is equipped with detection (e.g., the camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of order, as shown in any flowchart. For example, two blocks shown in succession may, in fact, be executed substantially concurrently, or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that does not depart from the broader scope of the claimed disclosure.

What is claimed is:

1. A method for grouping and displaying query results from multiple data stores, the method comprising:
   receiving a keyword as an input;
   determining a plurality of data stores to search based on the received keyword, wherein each data store of the plurality of data stores includes a different search index;
   generating a data store specific query based on the received keyword that is different for two or more different data stores of the plurality of data stores;
   receiving results from the two or more data stores based on respective data store specific queries, wherein results from the two or more data stores include a plurality of file identifiers identifying files located at respective data stores that are relevant to the keyword;
   receiving metadata associated with each file identifier of the plurality of file identifiers;
   grouping the results from the two or more data stores into a plurality of groups based on the metadata associated with each file identifier of the plurality of file identifiers;
   ranking the plurality of groups based on a relevancy associated with each group; and
   causing information associated with a ranked group of the ranked plurality of groups to be displayed at a user interface.

2. The method of claim 1, wherein grouping the results includes identifying similar or same files referenced by the file identifiers from two or more data stores of the plurality of data stores.

3. The method of claim 1, wherein at least one group of the plurality of groups includes a file identifier referencing a file at a first data store of the plurality of data stores and at least one group of the plurality of groups includes a file identifier referencing a file that is an e-mail attachment at a second data store of the plurality of data stores.

4. The method of claim 3, wherein the plurality of data stores includes a first data store and a second data store that is different from the first data store.

5. The method of claim 3, further comprising formatting the ranked plurality of groups according to a user selected view.

6. The method of claim 1, further comprising causing an icon associated with the ranked group of the ranked plurality of groups to be displayed at the user interface, wherein the icon includes a visual identifier visually identifying data stores corresponding to a location at which the displayed information associated with the ranked group of the ranked plurality of groups is stored.

7. The method of claim 1, wherein ranking the plurality of groups based on the relevancy associated with each group is based on a common metadata feature.

8. The method of claim 1, furthering comprising causing a first filename associated with a first ranked group of the ranked plurality of groups to be displayed at a first panel of the user interface and causing a second filename associated with a second ranked group of the ranked plurality of groups to be displayed at a second panel of the user interface, wherein the first panel and second panel are associated with different data stores.

9. The method of claim 1, wherein the relevancy associated with each group is based on at least one of a relevancy associated with individual file identifiers of the plurality of file identifiers within the respective group or metadata associated with individual file identifiers of the plurality of file identifiers within the respective group.

10. The method of claim 1, wherein at least one group of the plurality of groups includes multiple file identifiers referencing the same or similar files at different data stores.

11. A system for grouping and displaying query results from multiple data stores, the system comprising:
a processor; and
memory including instructions which when executed by the processor, cause the processor to:
receive from an input device, a keyword;
determine a plurality of data stores to search based on the received keyword, wherein each data store of the plurality of data stores includes a different search index;
generate a data store specific query based on the received keyword that is different for two or more different data stores of the plurality of data stores;
receive results from the two or more data stores based on respective data store specific queries, wherein results from the two or more data stores include a plurality of file identifiers identifying files located at respective data stores that are relevant to the keyword;
receive metadata associated with each file identifier of the plurality of file identifiers;
group the results from the two or more data stores into a plurality of groups based on the metadata associated with each file identifier of the plurality of file identifiers;
rank the plurality of groups based on a relevancy associated with each group; and
cause information associated with a ranked group of the ranked plurality of groups to be displayed at a user interface.

12. The system of claim 11, wherein the results are grouped by identifying similar or same files referenced by the file identifiers from two or more data stores of the plurality of data stores.

13. The system of claim 11, wherein at least one group of the plurality of groups includes a file identifier referencing a file at a first data store of the plurality of data stores and at least one group of the plurality of groups includes a file identifier referencing a file that is an e-mail attachment at a second data store of the plurality of data stores.

14. The system of claim 13, wherein the plurality of data stores includes a first data store and a second data store that is different from the first data store.

15. The system of claim 13, wherein the instructions, when executed by the processor, cause the processor to format the ranked plurality of groups according to a user selected view.

16. The system of claim 11, wherein the instructions, when executed by the processor, cause the processor to cause an icon associated with the ranked group of the ranked plurality of groups to be displayed at the user interface, wherein the icon includes a visual identifier visually identifying data stores corresponding to a location at which the displayed information associated with the ranked group of the ranked plurality of groups is stored.

17. The system of claim 11, wherein ranking the plurality of groups based on the relevancy associated with each group is based on a common metadata feature.

18. A computer-readable storage medium including instructions, when executed by a processor, cause the processor to:
receive from an input device, a keyword;
determine a plurality of data stores to search based on the received keyword, wherein each data store of the plurality of data stores includes a different search index;
generate a data store specific query based on the received keyword that is different for two or more different data stores of the plurality of data stores;
receive results from the two or more data stores based on respective data store specific queries, wherein results from the two or more data stores include a plurality of file identifiers identifying files located at respective data stores that are relevant to the keyword;
receive metadata associated with each file identifier of the plurality of file identifiers;
group the results from the two or more data stores into a plurality of groups based on the metadata associated with each file identifier of the plurality of file identifiers;
rank the plurality of groups based on a relevancy associated with each group; and
cause information associated with a ranked group of the ranked plurality of groups to be displayed at a user interface.

19. The computer-readable storage medium of claim 18, wherein at least one group of the plurality of groups includes a file identifier referencing a file at a first data store of the plurality of data stores and at least one group of the plurality of groups includes a file identifier referencing a file that is an e-mail attachment at a second data store of the plurality of data stores.

20. The computer-readable storage medium of claim 18, wherein the plurality of data stores includes a first data store and a second data store that is different from the first data store.

* * * * *